US012315988B2

(12) United States Patent
Lee et al.

(10) Patent No.: US 12,315,988 B2
(45) Date of Patent: May 27, 2025

(54) ARRANGEMENT STRUCTURE FOR COMMUNICATION DEVICE AND ELECTRONIC DEVICE INCLUDING THE SAME

(71) Applicant: Samsung Electronics Co., Ltd., Suwon-si (KR)

(72) Inventors: Jong Hyuck Lee, Seongnam-si (KR); Sehyun Park, Suwon-si (KR); Jae-Bong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 18/464,971

(22) Filed: Sep. 11, 2023

(65) Prior Publication Data

US 2023/0420829 A1 Dec. 28, 2023

Related U.S. Application Data

(63) Continuation of application No. 17/099,615, filed on Nov. 16, 2020, now Pat. No. 11,757,174, which is a (Continued)

(30) Foreign Application Priority Data

Nov. 27, 2017 (KR) ........................ 10-2017-0159219

(51) Int. Cl.
*H01Q 1/24* (2006.01)
*H01Q 9/04* (2006.01)
(Continued)

(52) U.S. Cl.
CPC ............. *H01Q 1/245* (2013.01); *H01Q 1/243* (2013.01); *H01Q 9/0407* (2013.01); (Continued)

(58) Field of Classification Search
CPC ...... H01Q 1/245; H01Q 1/243; H01Q 9/0407; H01Q 21/062; H01Q 21/065; (Continued)

(56) References Cited

U.S. PATENT DOCUMENTS 7,379,021 B2 5/2008 Lee
10,103,424 B2 10/2018 Noori et al.
(Continued)

FOREIGN PATENT DOCUMENTS

CN 206076482 U 4/2017
CN 106711579 A 5/2017
(Continued)

OTHER PUBLICATIONS

European Search Report dated Feb. 8, 2024, in connection with European Application No. 23189094.8, 9 pages.
(Continued)

*Primary Examiner* — Hai V Tran
*Assistant Examiner* — Michael M Bouizza

(57) ABSTRACT

According to various embodiments, an electronic device includes a housing including a front surface plate; a rear surface plate facing toward the opposite direction of the front surface plate; and a side surface member surrounding a space between the front surface plate and the rear surface plate, the side surface member having a substantially rectangular shape when viewed above the front surface plate; a first PCB arranged in the space; a first wireless communication circuit; a substrate; a first antenna array protruding from the first side of the substrate toward the first portion; a second antenna array protruding from the second side of the substrate toward the second portion; and a second wireless communication circuit.

15 Claims, 20 Drawing Sheets

Related U.S. Application Data continuation of application No. 16/201,500, filed on Nov. 27, 2018, now Pat. No. 10,840,583.

(51) Int. Cl.
*H01Q 21/06* (2006.01)
*H01Q 21/28* (2006.01)

(52) U.S. Cl.
CPC ......... *H01Q 21/062* (2013.01); *H01Q 21/065* (2013.01); *H01Q 21/067* (2013.01); *H01Q 21/28* (2013.01)

(58) Field of Classification Search
CPC ........ H01Q 21/067; H01Q 21/28; H01Q 1/38; H04M 1/026; H04M 1/0277; H04M 1/0249; H04B 1/38
See application file for complete search history.

(56) References Cited

U.S. PATENT DOCUMENTS

| | | | |
|---|---|---|---|
| 10,141,631 | B2 * | 11/2018 | Merli ..................... H01Q 1/243 |
| 10,205,224 | B2 | 2/2019 | Mow et al. |
| 10,418,687 | B2 | 9/2019 | Mow et al. |
| 2002/0122006 | A1 | 9/2002 | Crawford |
| 2007/0279286 | A1 | 12/2007 | Coutts et al. |
| 2013/0050052 | A1 | 2/2013 | Park et al. |
| 2013/0321240 | A1 | 12/2013 | O'Shea et al. |
| 2015/0116169 | A1 | 4/2015 | Mng |
| 2016/0308563 | A1 | 10/2016 | Ouyang et al. |
| 2017/0062953 | A1 | 3/2017 | Teshima et al. |
| 2017/0110787 | A1 * | 4/2017 | Ouyang ................... H01Q 1/42 |
| 2017/0142241 | A1 | 5/2017 | Kim et al. |
| 2017/0201011 | A1 | 7/2017 | Khripkov et al. |
| 2017/0201014 | A1 | 7/2017 | Lee et al. |
| 2017/0214120 | A1 | 7/2017 | Lee et al. |
| 2017/0222333 | A1 | 8/2017 | Sudo et al. |
| 2017/0244153 | A1 | 8/2017 | Chen et al. |
| 2017/0294705 | A1 | 10/2017 | Khripkov et al. |
| 2017/0302306 | A1 | 10/2017 | Ouyang et al. |
| 2017/0309992 | A1 | 10/2017 | Noori et al. |
| 2018/0026341 | A1 | 1/2018 | Mow et al. |
| 2018/0076530 | A1 | 3/2018 | Kawahata et al. |
| 2018/0309189 | A1 | 10/2018 | Gu et al. |
| 2019/0229421 | A1 | 7/2019 | Onaka et al. |

FOREIGN PATENT DOCUMENTS

| | | | |
|---|---|---|---|
| DE | 202017003830 | U1 | 11/2017 |
| EP | 3493326 | A1 | 6/2019 |
| JP | 3212835 | U | 10/2017 |
| KR | 10-2017-0056292 | A | 5/2017 |
| KR | 10-2017-0087753 | A | 7/2017 |
| TW | I273740 | B | 2/2007 |
| TW | 200719529 | A | 5/2007 |
| TW | M545375 | U | 7/2017 |

OTHER PUBLICATIONS

Rejection Decision dated Jan. 30, 2024, in connection with Chinese Application No. 202110370057.0, 15 pages.
International Search Report and Written Opinion of the International Searching Authority dated Mar. 6, 2019, in connection with International Application No. PCT/KR2018/014664, 7 pages.
European Search Report dated May 6, 2019, in connection with European Application No. EP18208602.5, 10 pages.
The First Office Action dated May 7, 2020, in connection with Chinese Application No. 201811432573.6, 22 pages.
LG Electronics Inc., "User Guide LG V60 ThinQ 5GUW LM-V600VM OS: Android 10," MFL71700801 (1.1), 2020, 225 pages.
LG Electronics Inc., "LG V60 Thinq 5G Dual Screen," Specification and Features, 2020, 1 page.
LG Electronics Inc., "LG V60 THINQ 5G," Specification and Features, 2020, 4 pages.
Abdullah, "LG V60 Caught in a Press Render," Gizchina Chinese Gadget Reviews, Feb. 22, 2020, 11 pages.
European Search Report dated Aug. 4, 2021, in connection with European Application No. 21167139.1, 11 pages.
Examination report dated Jun. 14, 2021, in connection with Indian Application No. 201844044588, 6 pages.
Notice of Preliminary Rejection dated Oct. 17, 2021, in connection with Korean Patent Application 10-2017-0159219, 17 pages.
Notice of Patent Grant dated Apr. 25, 2022, in connection with Korean Application No. 10-2017-0159219, 6 pages.
The First Office Action dated Dec. 16, 2022, in connection with Chinese Application No. 202110370057.0, 15 pages.
Notification of substantive examination result dated Jan. 9, 2023, in connection with Indonesian Application No. P00202004476, 6 pages.
Office Action dated Jul. 24, 2023, in connection with Chinese Patent Application No. 202110370057.0, 11 pages.
Third Office Action dated Oct. 30, 2023, in connection with Chinese Application No. 202110370057.0, 13 pages.

* cited by examiner

ARRANGEMENT STRUCTURE FOR COMMUNICATION DEVICE AND ELECTRONIC DEVICE INCLUDING THE SAME

CROSS-REFERENCE TO RELATED APPLICATIONS

This application is a continuation of application Ser. No. 17/099,615, filed Nov. 16, 2020, now U.S. Pat. No. 11,757,174, which is a continuation of application Ser. No. 16/201,500, filed Nov. 27, 2018, now U.S. Pat. No. 10,840,583, which claims priority under 35 U.S.C. § 119 to Korean Patent Application No. 10-2017-0159219, filed on Nov. 27, 2017, in the Korean Intellectual Property Office, the disclosures of which are incorporated by reference herein in their entirety.

BACKGROUND

1. Field

Various embodiments of the present disclosure relate to an arrangement structure for a communication device and an electronic device including the same.

2. Description of Related Art

With the development of wireless communication technology, electronic devices (for example, electronic devices for communication) are popularly used in our daily lives, and accordingly, use of contents is increasing exponentially. As use of contents is rapidly increasing, network capacities reach their limits. As low latency data communication is required, the introduction of next-generation wireless communication technology (for example, 5G communication) or high-speed wireless communication such as wireless gigabit alliance (WIGIG) (for example, 802.11AD) may be required.

The above information is presented as background information only to assist with an understanding of the present disclosure. No determination has been made, and no assertion is made, as to whether any of the above might be applicable as prior art with regard to the present disclosure.

SUMMARY

Next-generation wireless communication technology may use a millimeter wave of substantially 25 GHz or higher, and a communication device corresponding thereto may include a plurality of antenna arrays arranged on one surface of a dielectric (for example, a substrate), and a communication circuit (for example, a radio frequency integrated circuit (RFIC)) arranged on the other surface and electrically connected with the antenna arrays. According to an embodiment, the communication device may form a beam in a predetermined direction through a plurality of antenna elements, and may radiate a phase-adjusted signal in a specified direction.

The above-described next-generation wireless communication device provided in a module form may be substantially applied to a rear surface or a peripheral portion of an electronic device in order to overcome a beam coverage, and may be arranged to avoid interference by an existing communication device (for example, a $4^{th}$ generation wireless communication device).

Various embodiments of the present disclosure provide an arrangement structure for a communication device and an electronic device including the same.

Various embodiments of the present disclosure provide an arrangement structure for a communication device, which has a plurality of communication devices having the same configuration and arranged in various positions of an electronic device without changing designs, and an electronic device including the same.

According to an embodiment of the present disclosure, an electronic device includes: a housing including: a front surface plate; a rear surface plate facing toward the opposite direction of the front surface plate; and a side surface member surrounding a space between the front surface plate and the rear surface plate, the side surface member having a substantially rectangular shape when viewed above the front surface plate, the side surface member including: a first portion having a first length and extending in a first direction; a second portion having a second length longer than the first length, and extending in a second direction perpendicular to the first direction; a third portion having the first length and extending in the first direction in parallel with the first portion; and a fourth portion having the second length and extending in the second direction in parallel with the second portion; a first PCB arranged in the space; a first wireless communication circuit which is mounted on the first PCB and is electrically connected with a first point of the first portion of the side surface member, and provides wireless communication ranging from 500 MHz to 6000 MHz; a substrate arranged close to a corner in the space in parallel with the rear surface plate, the substrate including: a first side extending along a part of the first portion, a second side extending along the second portion; a third side extending in parallel with the first side; and a fourth side extending in parallel with the second side; a first antenna array protruding from the first side of the substrate toward the first portion; a second antenna array protruding from the second side of the substrate toward the second portion; and a second wireless communication circuit attached to a first part on the third side closer to the fourth side than the second portion, or attached to a second part on the fourth side closer to the third side than the first portion, wherein the second wireless communication circuit is electrically connected to the first antenna array and the second antenna array, and provides wireless communication ranging from 20 GHz to 100 GHz.

According to various embodiments, an electronic device includes: a housing including: a front surface plate; a rear surface plate facing toward the opposite direction of the front surface plate; and a side surface member surrounding a space between the front surface plate and the rear surface plate, the side surface member having a substantially rectangular shape when viewed above the front surface plate, the side surface member including: a first portion having a first length and extending in a first direction; a second portion having a second length longer than the first length and extending in a second direction perpendicular to the first direction; a third portion having the first length and extending in the first direction in parallel with the first portion; and a fourth portion having the second length and extending in the second direction in parallel with the second portion; a first substrate arranged in the space; a first wireless communication circuit which is mounted on the first substrate and is electrically connected with a first point of the first portion of the side surface member, and provides wireless communication of a first frequency band; a second substrate arranged in the proximity of a corner between the first portion and the second portion in the space in parallel with the rear surface plate, the second substrate including: a first side extending along a part of the first portion, a second side extending along the second portion; a third side extending in parallel with the first side; and a fourth side extending in parallel with the second side; a first antenna array arranged to form a beam pattern in a direction from the first side of the second substrate toward the first portion; a second antenna array arranged to form a beam pattern in a direction from the second side of the second substrate toward the second portion; a third substrate having a same configuration as that of the second substrate, and arranged in the proximity of a corner between the second portion and the third portion in the space in parallel with the rear surface plate, after being rotated by 90 degrees in the clockwise direction with reference to the arrangement state of the second substrate; a fourth substrate having a same configuration as that of the second substrate, and arranged in the proximity of a corner between the third portion and the fourth portion in the space in parallel with the rear surface plate, after being rotated by 90 degrees in the clockwise direction with reference to the arrangement state of the third substrate; a fifth substrate having a same configuration as that of the second substrate, and arranged in the proximity of a corner between the fourth portion and the first portion in the space in parallel with the rear surface plate, after being rotated by 90 degrees in the clockwise direction with reference to the arrangement state of the fourth substrate; and a second wireless communication circuit attached to a first part on the third side closer to the fourth side than the second portion, or attached to a second part on the fourth side closer to the third side than the first portion, wherein the second wireless communication circuit is electrically connected to the first antenna array and the second antenna array and provides wireless communication in a second frequency band.

The electronic device according to various embodiments of the present disclosure has a plurality of communication devices having the same configuration, and arranged on various positions of the electronic device without changing designs, such that an increase in the number of processes and an increase in costs by a design change of the communication device can be prevented, and radiation performance of the communication device can be enhanced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
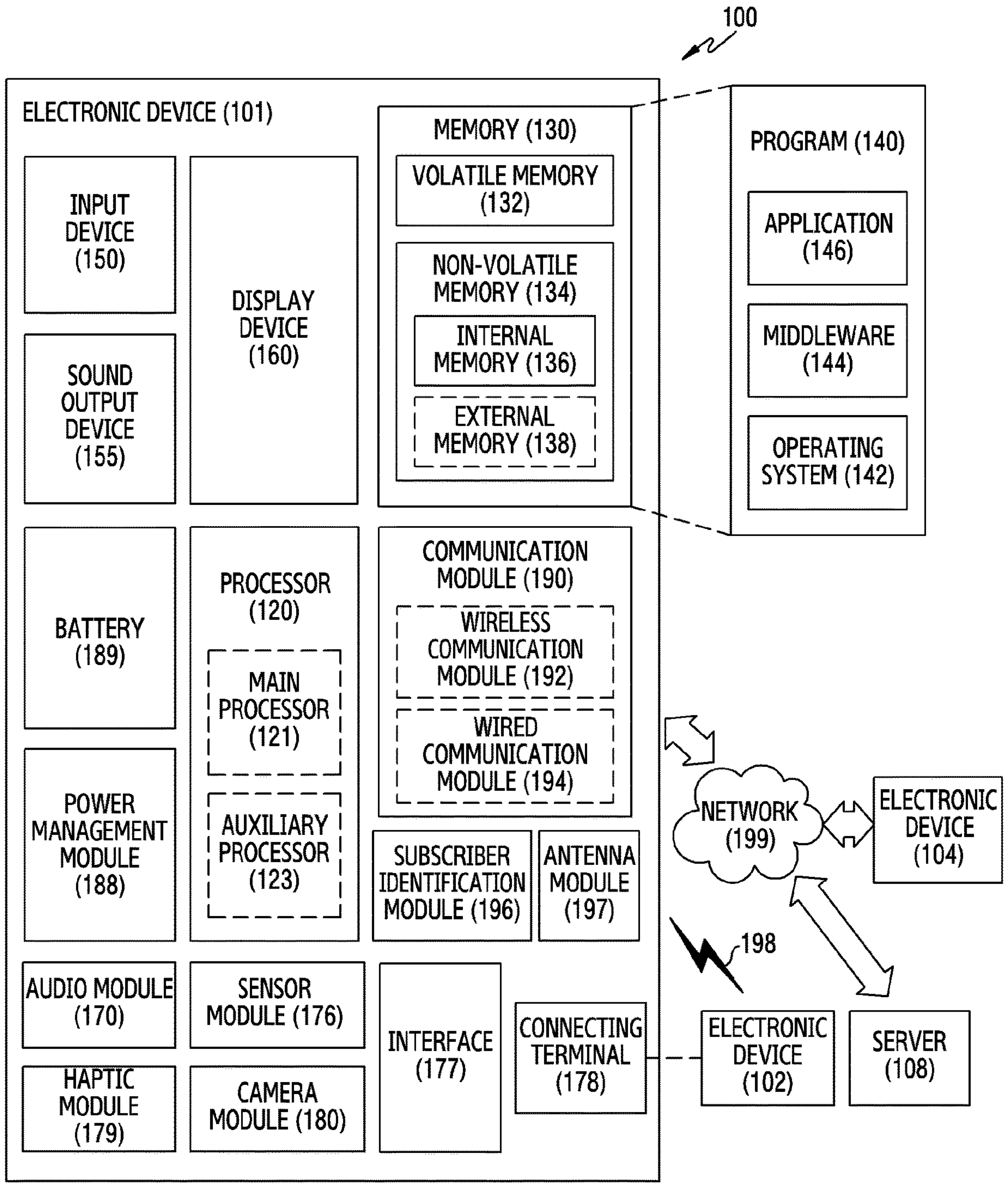
FIG. 1 is a block diagram illustrating an electronic device in a network environment according to various embodiments of the present disclosure.

FIG. 1 is a block diagram illustrating an electronic device in a network environment according to various embodiments of the present disclosure.

Referring to FIG. 1, the electronic device 101 in the network environment may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121. Additionally or alternatively, the auxiliary processor 123 may be adapted to consume less power than the main processor 121, or to be specific to a specified function. The auxiliary processor 123 may be implemented as separate from, or as embedded in the main processor 121.

In this case, the auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the user of the electronic device 101. The display device 160 may include, for example, a display, a hologram device, or a projector and control circuitry to control a corresponding device. According to an embodiment, the display device 160 may include touch circuitry or a pressure sensor adapted to measure the intensity of force incurred by a touch.

The audio module 170 may convert a sound into an electrical signal and vice versa. According to an embodiment, the audio module 170 may obtain the sound via the input device 150, or output the sound via the sound output device 155 or an external electronic device (e.g., the electronic device 102) (for example, a speaker or a headphone) wiredly or wirelessly coupled with the electronic device 101.

The sensor module 176 may generate an electrical signal or data value corresponding to an operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a specified protocol to be coupled with the external electronic device (e.g., the electronic device 102) wiredly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101, and may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a wired or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip, or may be implemented as multi chips separate from each other.

According to an embodiment, the wireless communication module 192 may identify and authenticate the electronic device 101 in a communication network, using user information stored in the subscriber identification module 196.

The antenna module 197 may include one or more antennas to transmit or receive a signal or power to or from the outside. According to an embodiment, the communication module 190 (e.g., the wireless communication module 192) may transmit or receive a signal to or from the external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the present disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and/or B," "at least one of "A, B, or C," or "A, B, and/or C," may include all possible combinations of the items enumerated together in a corresponding one of the phrases. As used herein, such terms as "$1^{st}$" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a machine-readable storage medium (e.g., internal memory 136 or external memory 138) that is readable by a machine (e.g., a computer). The machine may invoke an instruction stored in the storage medium, and may be operated according to the instruction invoked, and may include an electronic device (e.g., the electronic device 101) according to disclosed embodiments. When the instruction is executed by the processor (e.g., the processor 120), the processor may execute a function corresponding the instruction, with or without using one or more other components under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., PLAY STORE™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
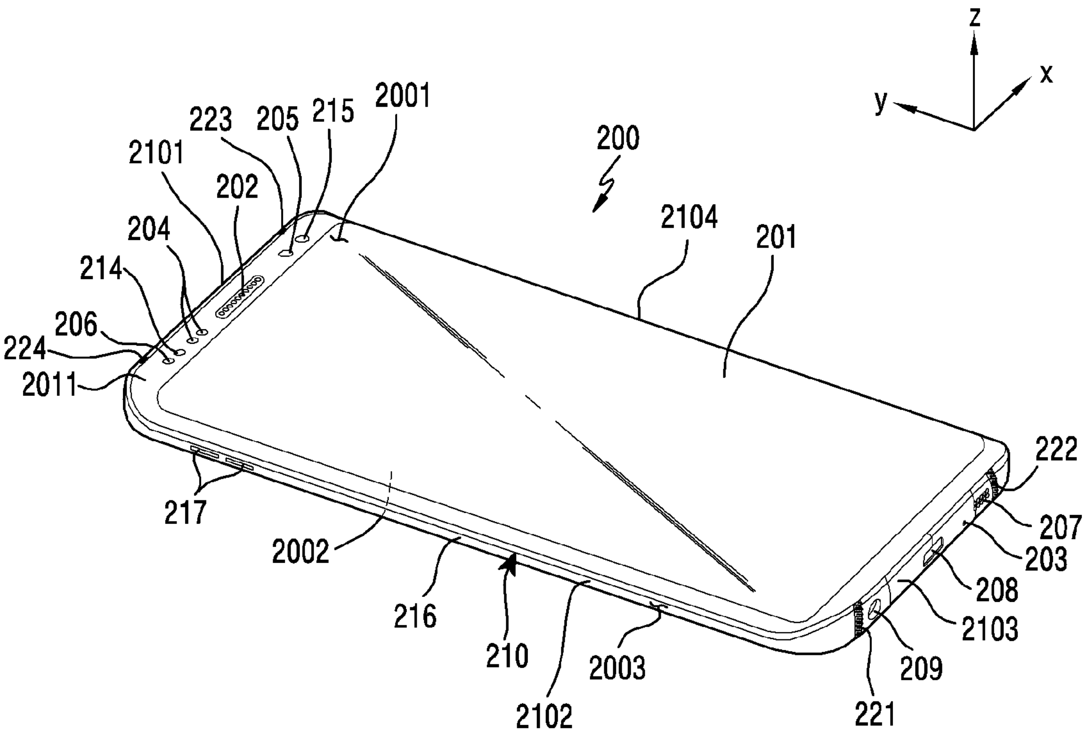
FIGS. 2A and 2B are perspective views illustrating an electronic device according to various embodiments of the present disclosure.
Figure 2B:
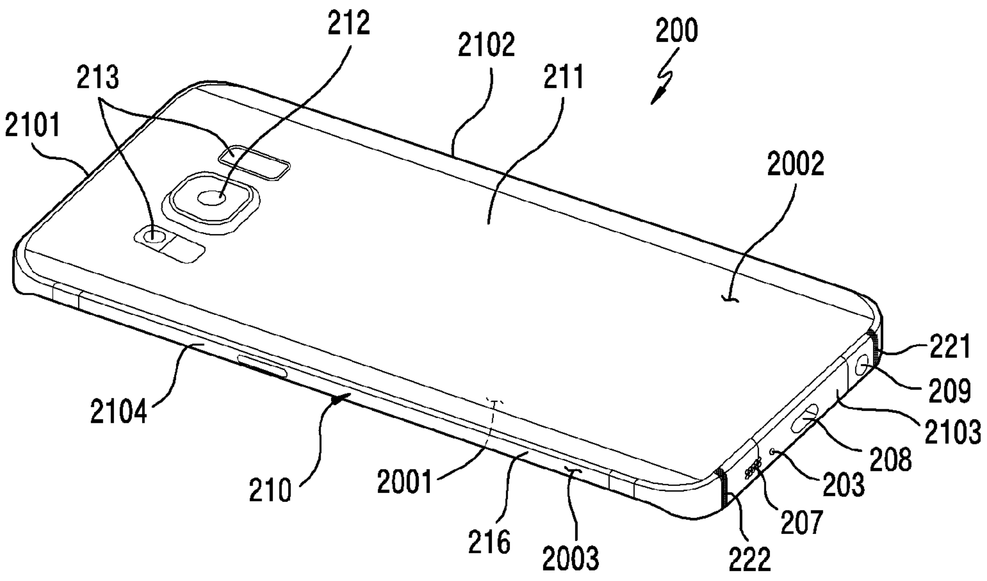

FIGS. 2A and 2B are perspective views illustrating an electronic device according to various embodiments of the present disclosure.

FIG. 2A is a front surface perspective view of the electronic device, and FIG. 2B is a rear surface perspective view of the electronic device.

The electronic device 200 of FIGS. 2A and 2B may be similar to the electronic device 101 of FIG. 1 at least in part, or may include other embodiments of the electronic device.

Referring to FIGS. 2A and 2B, the electronic device 200 may include a housing 210. According to an embodiment, the housing 210 may be formed of a conductive member and/or a nonconductive member. According to an embodiment, the housing 210 may include a first surface 2001 (for example, a front surface or a top surface) facing toward a first direction (for example, a Z-axis direction), a second surface 2002 (for example, a rear surface or a bottom surface) arranged opposite the first surface 2001, and a side surface 2003 arranged to surround at least part of the first surface 2001 and the second surface 2002. According to an embodiment, the side surface 2003 may be coupled with a front surface plate 2011 (for example, a glass plate including various coating layers or a polymer plate) and a rear surface plate 211, and may be formed by a side surface member 216 including metal and/or polymer. According to an embodiment, the rear surface plate 211 may be formed from coted or colored glass, ceramic, polymer, metal (for example, aluminum, stainless steel (STS), or magnesium), or a combination of at least two materials of the above-described materials.

According to various embodiments, the side surface 2003 may be coupled with the front surface plate 2011 and the rear surface plate 211, and may be formed by the side surface member 216 (or a "side surface bezel structure") including metal and/or polymer. According to an embodiment, the rear surface plate 211 and the side surface member 216 may be integrally formed with each other, and may include the same material (for example, a metallic material such as aluminum or magnesium). According to an embodiment, the housing 210 may include a first portion 2101 having a first length, a second portion 2102 extending perpendicular to the first portion 2101 and having a second length, a third portion 2103 extending from the second portion 2102 to have the first length in parallel with the first portion 2101, and a fourth portion 2104 extending from the third portion 2103 to have the second length in parallel with the second portion 2102. According to an embodiment, the first portion 2101 may have a unit conductive portion 2101 electrically isolated by a pair of nonconductive portions 223, 224 spaced apart from each other by a predetermined distance. In addition, the third portion 2103 may also have a unit conductive portion 2103 electrically isolated by a pair of nonconductive portions 221, 222 spaced apart from each other by a predetermined distance. However, this should not be considered as limiting. The first portion 2101 and the third portion 2103 formed as a unit conductive portion may be formed by one or more nonconductive portions. The conductive portions 2101, 2103 electrically isolated may be electrically connected with a communication circuit (for example, a communication circuit 390 of FIG. 3) arranged inside the electronic device 200, and may be utilized as antennas operating in at least one resonant frequency band.

According to various embodiments, the electronic device 200 may include the front surface plate 2011 (for example, a window or glass plate) arranged on the first surface 2001, and a display 201 (for example, a touch screen display) arranged to be exposed through at least one portion of the front surface plate 2011. According to an embodiment, the display 201 may be coupled with a touch detection circuit, a pressure sensor for measuring an intensity (pressure) of a touch, and/or a pen detection sensor (for example, a digitizer) for detecting a stylus pen of a magnetic field scheme, or may be arranged adjacent thereto.

According to various embodiments, the electronic device 200 may include a receiver hole 202 for communication. According to an embodiment, the electronic device 200 may be controlled to use a speaker arranged therein and to talk with the other person through the receiver hole 202 for communication. According to an embodiment, the electronic device 200 may include a microphone hole 203. According to an embodiment, the electronic device 200 may use at least one microphone arranged therein to detect a direction of a sound, and may receive an external sound or transmit a user's voice to the other person through the microphone hole 203.

According to various embodiments, the electronic device 200 may include at least one key input device 217. According to an embodiment, the key input device 217 may include at last one side key button 217 arranged on the side surface 2003 of the housing 210. According to an embodiment, the at least one side key button 217 may include a volume control button, a wake-up button, or a specific function (for example, an artificial intelligence execution function or a rapid voice recognition execution mode entering function) performance button.

According to various embodiments, the electronic device 200 may include components which are exposed through the display 201, or are arranged to perform functions through the front surface plate 2011, but not to exposed, and performs various functions of the electronic device 200. According to an embodiment, at least part of the components may be arranged to be in contact with an external environment from the inside of the electronic device through at least one portion of the front surface plate 2011 of a transparent material. According to an embodiment, the components may include at least one sensor module 204. The sensor module 204 may include, for example, an illuminance sensor (for example, a light sensor), a proximity sensor (for example, a light sensor), an infrared sensor, an ultrasound sensor, a fingerprint recognition sensor, a face recognition sensor, an electromagnetic (EM) sensor, or an iris recognition sensor. According to an embodiment, the components may include a first camera device 205. According to an embodiment, the components may include an indicator 206 (for example, an LED device) for visually providing state information of the electronic device 200 to the user. According to an embodiment, the components may include a light source 214 (for example, an infrared LED) arranged at one side of the receiver hole 202. According to an embodiment, the components may include an imaging sensor assembly 215 (for example, an iris camera) for detecting an iris image when light generated from the light source 214 is irradiated onto the vicinity of user's eyes. According to an embodiment, at least one of the components may be arranged to be exposed through at least one portion of the second surface 2002 (for example, a rear surface or a bottom surface) facing toward a direction (for example, the −Z axis direction) opposite the first direction of the electronic device 200.

According to various embodiments, the electronic device 200 may include an external speaker hole 207. According to an embodiment, the electronic device 200 may use a speaker arranged therein, and may emit a sound through the external speaker hole 207. According to an embodiment, the electronic device 200 may include a first connector hole 208 (for example, an interface connector port) for performing a data exchanging function with an external device, and for receiving external power and charging the electronic device 200. According to an embodiment, the electronic device 200 may include a second connector hole 209 (for example, an ear jack assembly) for receiving an ear jack of an external device.

According to various embodiments, the electronic device 200 may include the rear surface plate 211 (for example, a rear surface window) arranged on the second surface 2002. According to an embodiment, a rear facing camera device 212 may be arranged on the rear surface plate 211. At least one electronic component 213 may be arranged in the proximity of the rear facing camera device 212. According to an embodiment, the electronic component 213 may include at least one of an illuminance sensor (for example, a light sensor), a proximity sensor (for example, a light sensor), an infrared sensor, an ultrasound sensor, a heartbeat sensor, a fingerprint recognition sensor, an EM sensor, or a flash device.

According to various embodiments, the display 201 may include a touch panel and a display panel which are layered on the rear surface of the front surface plate 2011. According to an embodiment, an image displayed through the display panel may be provided to the user through the front surface plate 2011 of a transparent material. According to an embodiment, the front surface plate 2011 may use various materials such as transparent glass or acryl.

According to various embodiments, the electronic device 200 may include a waterproof structure. According to an embodiment, the electronic device 200 may include at least one waterproof member (sealing member) arranged therein to perform a waterproof function. According to an embodiment, the at last one waterproof member may be arranged between the display 201 and the side surface member 216 and/or between the side surface member 216 and the rear surface plate 211.

According to various embodiments, the electronic device 200 may include at least one communication device (for example, a communication device 400 of FIG. 4A) using a millimeter wave (for example, a band of around 25 GHz or higher) as an operating frequency band. According to an embodiment, the communication device may include an antenna array including a plurality of antenna elements arranged on a dielectric (for example, a substrate) at regular intervals, and the antenna array may form a beam in at least one direction, and may transmit and receive signals in a beam forming direction through a communication circuit (for example, a radio frequency integrated circuit (RFIC) 311, 321, 331, 341 of FIG. 3). According to an embodiment, a phase shifting means (for example, a phase shifter) (not shown) may be included in the proximity of the communication device.

According to various embodiments, the at least one communication device may be arranged in each corner of the electronic device. However, this should not be considered as limiting. The at least one communication device may be arranged in at least one portion of a rear surface and/or an edge of the electronic device. According to an embodiment, even when a mounting position of the communication device is changed in the electronic device through appropriate arrangements of the antenna array and the communication circuit, optimal radiation performance can be implemented by considering only an arrangement direction without changing the design of the communication device.

Figure 3:
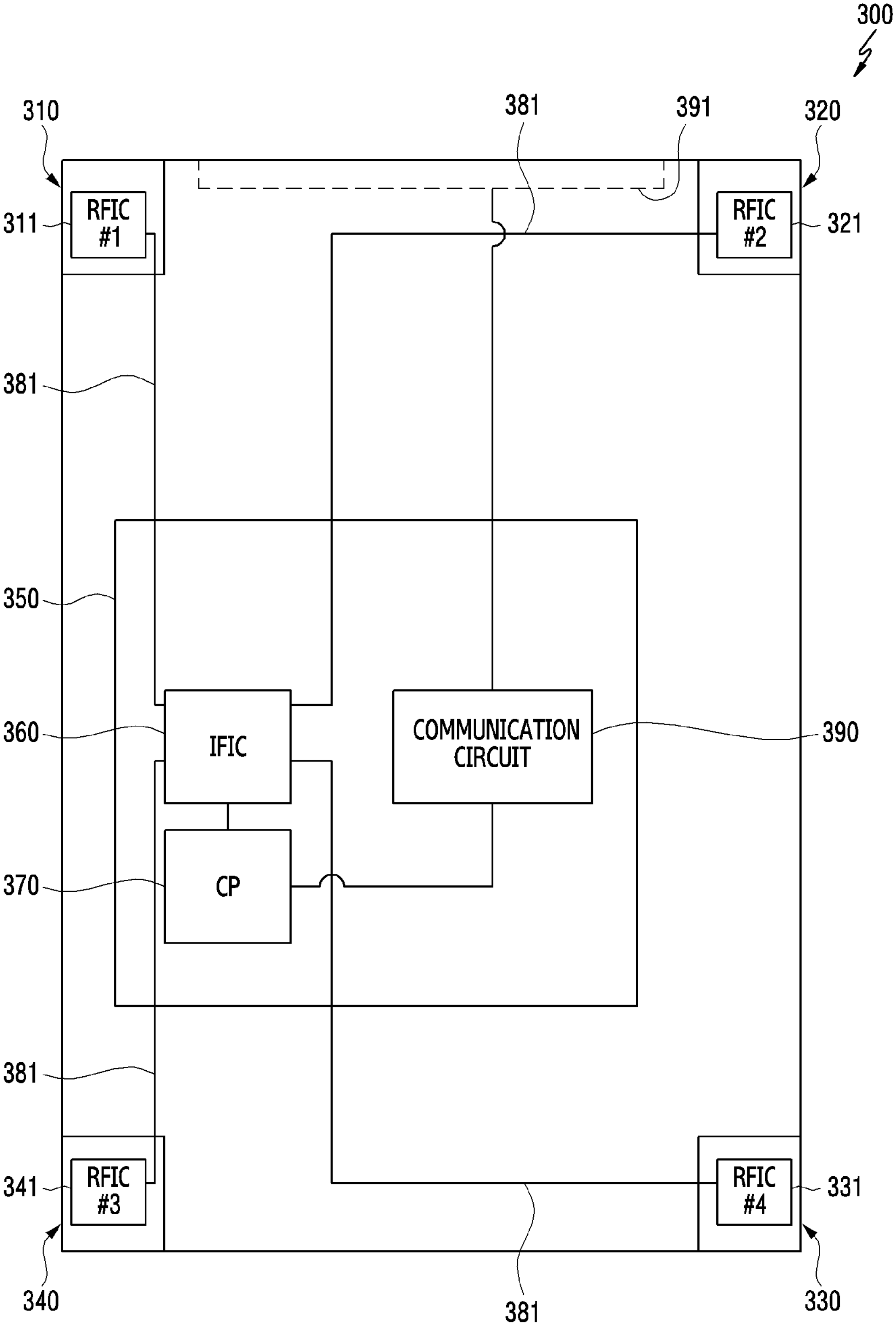
FIG. 3 is a view illustrating an arrangement relationship of a communication device in an electronic device according to various embodiments of the present disclosure.

FIG. 3 is a view illustrating an arrangement relationship of a communication device in an electronic device according to various embodiments of the present disclosure.

According to an embodiment, the electronic device 300 of FIG. 3 may be similar to the electronic device 101 of FIG. 1 or the electronic device 200 of FIG. 2A at least in part, or may include other embodiments of the electronic device.

Referring to FIG. 3, the electronic device 300 may include at least one communication device 310, 320, 330, 340. According to an embodiment, the communication device 310, 320, 330, 340 may have antenna elements arranged on a substrate (printed circuit board (PCB)) at regular intervals in the form of at least one array, and may transmit and receive a signal for a designated direction through an RFIC 311, 321, 331, 341 arranged on the substrate. According to an embodiment, the antenna element may include a conductive member formed on the substrate in a patch type (or pattern type), or an antenna element of a dipole form According to various embodiments, the electronic device 300 may include a PCB 350 (for example, a main PCB) mounted in an inner space thereof. According to an embodiment, the electronic device 300 may include a processor 370 (for example, a CP), an intermediate frequency IC 360 (for example, an IFIC), and a communication circuit which are mounted on the PCB 350. According to an embodiment, the RFIC 311, 321, 331, 341 arranged in the communication device may be electrically connected to the intermediate frequency IC 360 through an electric connection member 381 (for example, a coaxial cable). According to an embodiment, a signal received through the communication device 310, 320, 330, 340 may be converted into an intermediate frequency signal through the RFIC 311, 321, 331, 341, and the intermediate frequency signal may be changed to a base band frequency through the intermediate frequency IC 360, and may be provided to the processor 370.

According to various embodiments, the communication circuit 390 arranged on the PCB 350 may be electrically connected to a conductive member 391 (for example, the first portion 2101 of FIG. 2A) arranged in at least part of the electronic device, thereby transmitting and receiving a wireless signal through the conductive member 391. According to an embodiment, the communication circuit 390 electrically connected with the conductive member 391 may provide wireless communication ranging from around 500 MHz to 6000 MHz. According to an embodiment, the RFIC 311, 321, 331, 341 included in the communication device 310, 320, 330, 340 and electrically connected with the plurality of antenna elements may provide wireless communication ranging from around 20 GHz to 100 GHz.

Figure 4A:
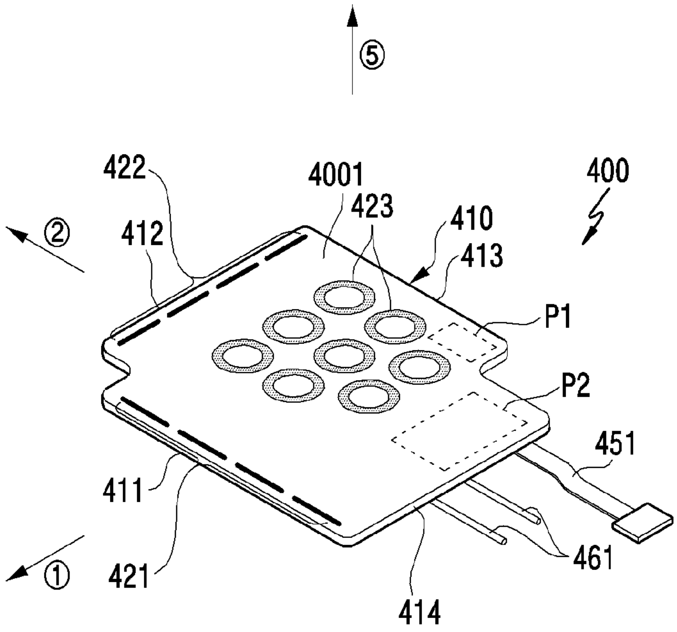
FIGS. 4A and 4B are perspective views illustrating a communication device according to various embodiments of the present disclosure.
Figure 4B:
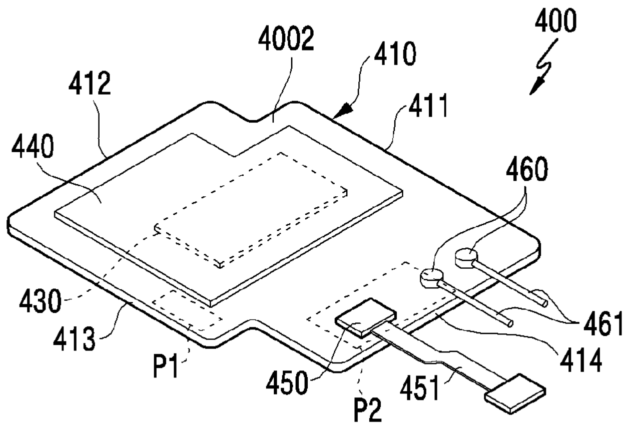

FIGS. 4A and 4B are perspective views illustrating a communication device according to various embodiments of the present disclosure.

According to an embodiment, the communication device 400 of FIG. 4A may be similar to the communication device 310, 320, 330, 340 of FIG. 3 at least in part, or may include other embodiments of the communication device.

Referring to FIGS. 4A and 4B, the communication device 400 may include a substrate 410 (for example, a dielectric). According to an embodiment, the substrate 410 may include a first surface 4001 and a second surface 4002 facing toward the opposite direction of the first surface 4001. According to an embodiment, the communication device 400 may be arranged in an electronic device in such a manner that the first surface 4001 faces toward a rear surface plate (for example, the rear surface plate 211 of FIG. 2B) of the electronic device (for example, the electronic device 200 of FIG. 2B).

According to various embodiments, the substrate 410 may be formed in a substantially rectangular shape. According to an embodiment, the substrate 410 may include a first side 411, a second side 412 extending from the first side 411 perpendicular to the first side 411, a third side 413 extending from the second side 412 perpendicular to the second side 412 and in parallel with the first side 411, and a fourth side 414 extending from the third side 413 perpendicular to the third side 413 and in parallel with the second side 412.

According to various embodiments, the communication device 400 may include at least one antenna array arranged on the first surface 4001 of the substrate 410. According to an embodiment, the at least one antenna array may include a patch type or pattern type conductive member formed on the first surface 4001 of the substrate 410. According to an embodiment, the antenna array may include a first antenna array 421 which forms a beam pattern to radiate toward the first side 411 of the substrate 410 (for example, the direction of ①), a second antenna array 422 which forms a beam pattern to radiate toward the second side 412 of the substrate 410 (for example, the direction of ②), and a third antenna array 423 which forms a beam pattern to radiate toward the rear surface plate (for example, the rear surface plate 211 of FIG. 2B) of the electronic device (for example, the direction of ⑤). According to an embodiment, the first antenna array 421 and the second antenna array 422 may include a dipole antenna radiator formed on the first surface 4001 of the substrate 410 in a pattern type. However, this should not be considered as limiting. The first antenna array 421 and the second antenna array 422 may be arranged on the second surface 4002 of the substrate 410 adjacent to the first side 411 and the second side 412 of the substrate 410, respectively, or may be arranged on a side surface between the first surface 4001 and the second surface 4002. According to an embodiment, the third antenna array 423 may include a patch type conductive member formed on the first surface 4001 of the substrate 410. According to an embodiment, the communication device 400 may include only the third antenna array 423 and may not include the first antenna array 421 and the second antenna array 422 arranged on the first side 411 and the second side 412, respectively, to radiate laterally.

According to various embodiments, the communication device 400 may include a communication circuit 430 (for example, an RFIC) arranged on the second surface 4002 of the substrate 410. According to an embodiment, the antenna arrays 421, 422, 423 may be electrically connected with the communication circuit 430 through a conductive via penetrating from the first surface 4001 of the substrate 410 to the second surface 4002. However, this should not be considered as limiting. The antenna arrays 421, 422, 423 may be fed through coupling with the communication circuit 430 (capacitively). According to an embodiment, the communication device 400 may include a shield can 440 arranged or mounted on the second surface 4002 of the substrate 410 to cover or surround at least a portion of the communication circuit 430. According to an embodiment, the communication circuit 430 is shielded from a noise by the shield can 440. According to an embodiment, the communication device 400 may include at least one terminal 450, 460 to be electrically connected with a PCB (for example, the PCB 350 of FIG. 3) of the electronic device (for example, the electronic device 300 of FIG. 3) through at least one portion of the substrate 410. According to an embodiment, the terminal 450, 460 may include a power terminal 450 and/or an RF terminal 460 to be electrically connected with the PCB of the electronic device through an electric connection member. According to an embodiment, the electric connection member may include a flexible PCB (FPCB) 451 or a coaxial cable 461. According to an embodiment, it is illustrated that the electric connection member is divided into two or more members, but the electric connection members may be formed on a single FPCB altogether. According to an embodiment, a drawing-out direction of the electric connection member may face toward the left or right of the communication circuit 430 or a lower end (for example, a lower end of the middle of the third antenna array 423). According to an embodiment, the at least one terminal 450, 460 may be arranged on a region of the substrate that is spaced apart from the beam pattern direction by the antenna array 421, 422, 423 among regions of the substrate 410. According to an embodiment, the at least one terminal 450, 460 may be arranged on a region of the substrate 410 that is spaced apart from the beam pattern direction (for example, a radiation direction) (the direction of ①) of the first antenna array 421, the beam pattern direction (for example, a radiation direction) (the direction of ②) of the second antenna array 422, and the beam pattern direction (for example, a radiation direction) (the direction of ⑤) of the third antenna array 423. According to an embodiment, the at least one terminal 450, 460 may be arranged on a first part P1 that is a region of the third side 413 of the substrate 410 spaced apart from the first side 411 and the second side 412, and/or a second part P2 that is a region of the fourth side 414 of the substrate 410 spaced apart from the first side 411 and the second side 412. According to an embodiment, the at least one terminal 450, 460 may be arranged on the third side 413 and/or the fourth side 414, rather than on the first side 411 and the second side 412 on which the first antenna array 421 and the second antenna array 422 are arranged, spaced apart from the first and second antenna arrays 421, 422 by a specified distance.

Figure 5:
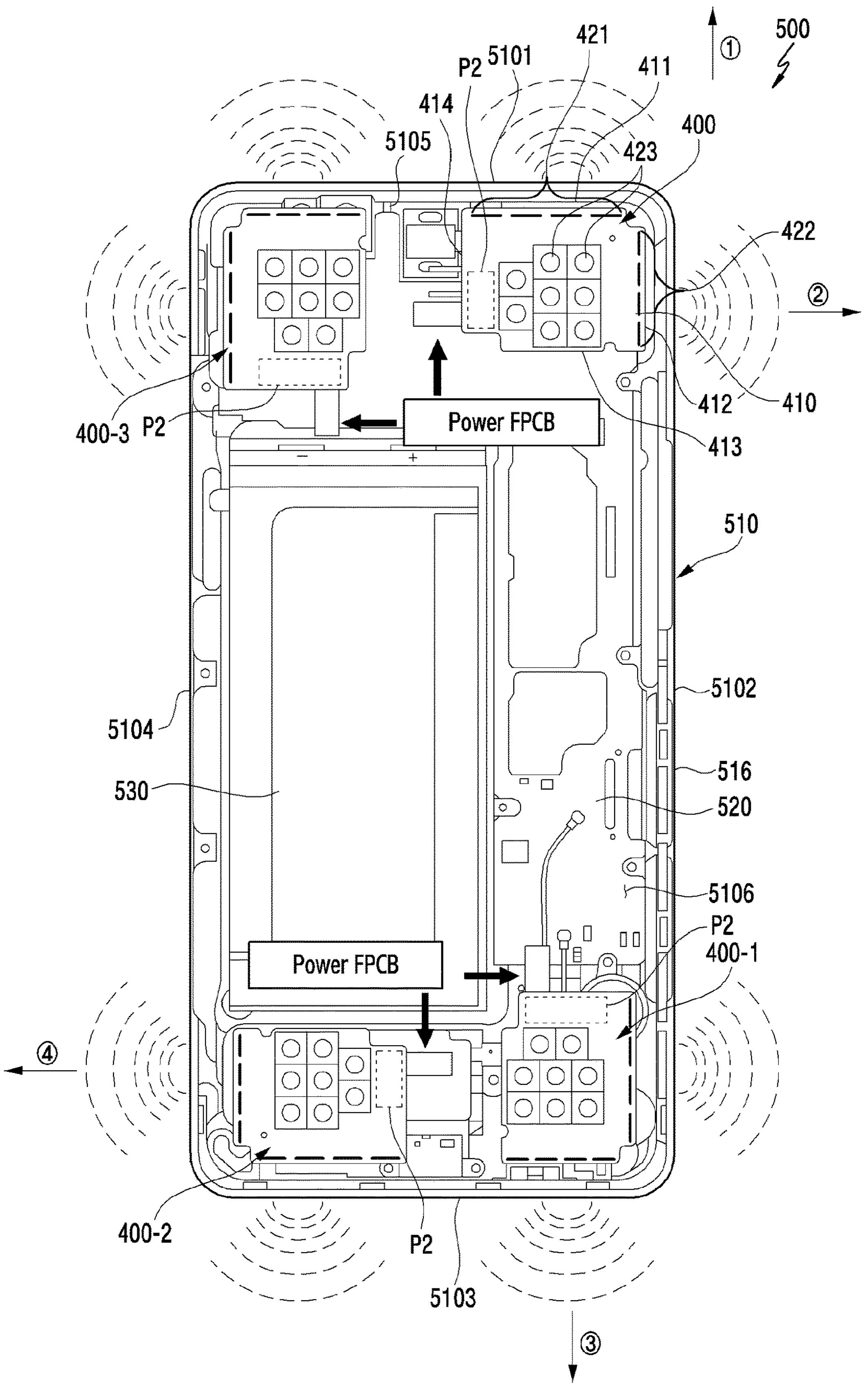
FIG. 5 is a view illustrating an arrangement of a communication device according to various embodiments of the present disclosure.

FIG. 5 is a view illustrating an arrangement of a communication device according to various embodiments of the present disclosure. FIG. 5 illustrates a rear surface of an electronic device with a rear surface plate being removed when viewed from above.

According to an embodiment, the electronic device 500 of FIG. 5 may be similar to the electronic device 101 of FIG. 1, the electronic device 200 of FIG. 2A, or the electronic device of FIG. 3 at least in part, or may include other embodiments of the electronic device.

Referring to FIG. 5, the electronic device 500 may include a housing 510. According to an embodiment, the housing 510 may include a side surface member 516. According to an embodiment, the side surface member 516 may have at least one portion formed by a conductive member, and may be implemented as a unit conductive portion by a nonconductive portion, thereby operating as an antenna radiator. According to an embodiment, a first point 5105 of a first portion 5101 formed by a conductive member may be electrically connected with a communication circuit (for example, the communication circuit 390 of FIG. 3) of the electronic device 500. According to an embodiment, the communication circuit may provide wireless communication ranging from around 500 MHz to 6000 MHz by using the first portion.

According to various embodiments, the housing 510 may include the first portion 5101 having a first length, a second portion 5102 extending perpendicular to the first portion 5101 and having a second length, a third portion 5103 extending from the second portion 5102 in parallel with the first portion 5101 to have the first length, and a fourth portion 5104 extending from the third portion 5103 in parallel with the second portion 5102 to have the second length.

According to various embodiments, at least one communication device 400, 400-1, 400-2, 400-3 may be arranged in an inner space 5106 of the electronic device 500. According to an embodiment, the at least one communication device 400, 400-1, 400-2, 400-3 may be arranged on a position which overlaps or does not overlap a PCB 520 (for example, a main PCB) of the electronic device. According to an embodiment, the PCB 520 may be arranged to avoid a battery 530. The communication device 400, 400-1, 400-2, 400-3 may be arranged to avoid overlapping the battery 530 and/or the PCB 520 or to overlap the battery 530 and/or the PCB 520 at least in part. According to an embodiment, the at least one communication device 400, 400-1, 400-2, 400-3 may be arranged in at least one corner of the electronic device 500 which has a substantially rectangular shape. However, this should not be considered as limiting. The at least one communication device 400, 400-1, 400-2, 400-3 may be arranged on an edge rather than in a corner or may be arranged in a corner and on an edge in combination. According to an embodiment, the first communication device 400 may be arranged to have a first side 411 be adjacent to the first portion 5101 of the housing 510, and to have a second side 412 be adjacent to the second portion 5102 of the housing 510. In this case, a second part P2 of the substrate 410 on which a power terminal (for example, the power terminal 450 of FIG. 4B) and an RF terminal (for example, the RF terminal 460 of FIG. 4B) are arranged may be arranged to face toward the center of the electronic device 500, spaced apart from the beam pattern directions (for example, radiation directions) (the directions of ① and ②) of the first communication device 400. According to an embodiment, the second communication device 400-1 may be arranged in a corner between the second portion 5102 and the third portion 5103 of the housing 510 after being rotated by 90 degrees in the clockwise direction with reference to the first communication device 400. In this case, the second part P2 of the second communication device 400-1 may also be arranged to face toward the center of the electronic device 500, spaced apart from the beam pattern directions (for example, radiation directions) (the directions of ② and ③) of the second communication device 400-1. According to an embodiment, the third communication device 400-2 may be arranged in a corner between the third portion 5103 and the fourth portion 5104 after being rotated by 90 degrees in the clockwise direction with reference to the second communication device 400-1. In this case, the second part P2 of the third communication device 400-2 may also be arranged to face toward the center of the electronic device 500, spaced apart from the beam pattern directions (for example, radiation directions) (the directions of ③ and ④) of the third communication device 400-2. According to an embodiment, the fourth communication device 400-3 may be arranged in a corner between the fourth portion 5104 and the first portion 5101 after being rotated by 90 degrees in the clockwise direction with reference to the third communication device 400-2. In this case, the second part P2 of the fourth communication device 400-3 may also be arranged to face toward the center of the electronic device 500, spaced apart from the beam pattern directions (for example, radiation directions) (the directions of ④ and ①) of the fourth communication device 400-3. According to an embodiment, the at least one communication device 400, 400-1, 400-2, 400-3 may form a beam pattern in a direction toward the rear surface plate (for example, the direction of −Z of FIG. 2A) by a third antenna array 423.

According to various embodiments, the four communication devices 400, 400-1, 400-2, 400-3 arranged in the electronic device 500 may have the same or similar configuration as or to that of the communication device of FIG. 4A and FIG. 4B. For example, the communication device of FIG. 4A and FIG. 4B may be applied to four corners of the electronic device by changing only its arrangement direction without separately changing a design. For example, the communication device 400, 400-1, 400-2, 400-3 has the power terminal and the RF terminal implemented on a region of the substrate that is spaced apart from the beam pattern direction (for example, a direction facing toward the outside from the inside of the electronic device) of a wireless signal by the antenna array. Therefore, even when the arrangement position of the communication device, designed to have the same configuration, is changed by rotating the communication device, the power terminal and the RF terminal may always be arranged to face toward the center of the electronic device. Even when the arrangement position of the communication device according to an embodiment is changed, the design of each communication device may not be changed in consideration of the beam pattern direction.

Figure 6A:
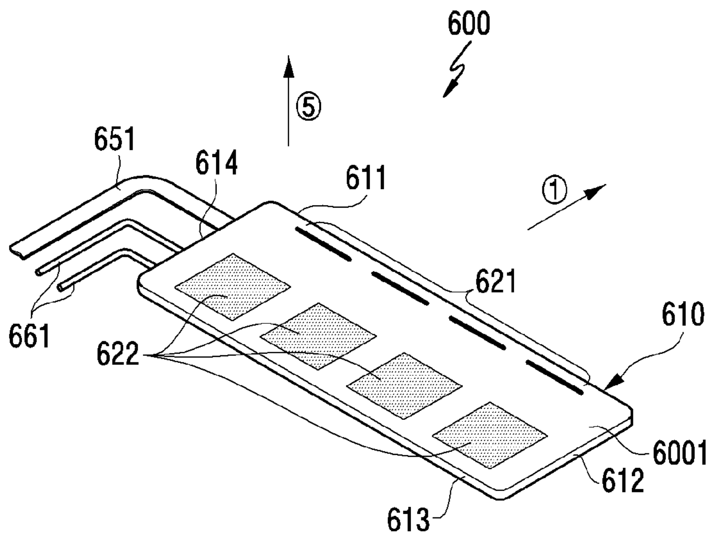
FIGS. 6A and 6B are perspective views illustrating a communication device according to various embodiments of the present disclosure.
Figure 6B:
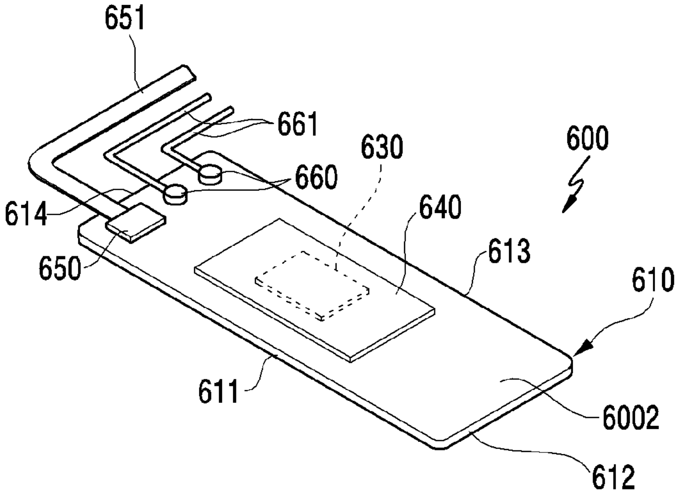

FIGS. 6A and 6B are perspective views illustrating a communication device according to various embodiments of the present disclosure.

According to an embodiment, the communication device 600 of FIGS. 6A and 6B may be similar to the communication device 310, 320, 330, 340 of FIG. 3 at least in part, or may include other embodiments of the communication device.

Referring to FIGS. 6A and 6B, unlike in FIGS. 4A and 4B, antenna elements 621, 622 are arranged in the form of 1×4 in the communication device.

According to an embodiment, the communication device 600 may include a substrate 610 (for example, a dielectric). According to an embodiment, the substrate 610 may include a first surface 6001 and a second surface 6002 facing toward the opposite direction of the first surface 6001. According to an embodiment, the communication device 600 may be arranged in an electronic device in such a manner that the first surface 6001 faces toward a rear surface plate (for example, the rear surface plate 211 of FIG. 2B) of the electronic device (for example, the electronic device 200 of FIG. 2B).

According to various embodiments, the substrate 610 may be formed in a substantially rectangular shape. According to an embodiment, the substrate 610 may include a first side 611, a second side 612 extending from the first side 611 perpendicular to the first side 611, a third side 613 extending from the second side 612 perpendicular to the second side 612 and in parallel with the first side 611, and a fourth side 614 extending from the third side 613 perpendicular to the third side 613 and in parallel with the second side 612.

According to various embodiments, the communication device 600 may include at least one antenna array (for example, a first antenna array 621, or a second antenna array 622) arranged on the first surface 6001 of the substrate 610. According to an embodiment, the plurality of antenna arrays 621, 622 may include a patch type or pattern type conductive member formed on the first surface 6001 of the substrate 610. According to an embodiment, the antenna arrays may include the first antenna array 621 which forms a beam pattern to radiate toward the first side 611 (for example, the direction of ①) of the substrate 610, and the second antenna array 622 which forms a beam pattern to radiate toward the rear surface plate (for example, the rear surface plate 211 of FIG. 2B) (for example, the direction of ⑤) of the electronic device. According to an embodiment, the first antenna array 621 may include a dipole antenna radiator formed on the first surface 6001 of the substrate 610 in a pattern type. However, this should not be considered as limiting. The first antenna array 621 may be arranged on the second surface 6002 of the substrate 610 adjacent to the first side 611 of the substrate 610, or may be arranged on a side surface between the first surface 6001 and the second surface 6002. According to an embodiment, the second antenna array 622 may include a patch type conductive member formed on the first surface 6001 of the substrate 610.

According to various embodiments, the communication device 600 may include a communication circuit 630 (for example, an RFIC) arranged on the second surface 6002 of the substrate 610. According to an embodiment, the antenna arrays 621, 622 may be electrically connected with the communication circuit 630 through a conductive via penetrating from the first surface 6001 of substrate 610 to the second surface 6002. However, this should not be considered as limiting. The antenna arrays 621, 622 may be fed through coupling (capacitively) of at least portions of a feeding line with the communication circuit 630. According to an embodiment, the communication device 600 may include a shield can 640 arranged or mounted on the second surface 6002 of the substrate 610 to cover or surround at least a portion of the communication circuit 630. According to an embodiment, the communication circuit 630 is shielded from a noise by the shield can 640. According to an embodiment, the communication device 600 may include at least one terminal 650, 660 to be electrically connected with a PCB (for example, the PCB 350 of FIG. 3) of an electronic device (for example, the electronic device 300) through at least one portion of the substrate 610. According to an embodiment, the terminal 650, 660 may include a power terminal 650 and an RF terminal 660 to be electrically connected with the PCB of the electronic device through an electric connection member. According to an embodiment, the electric connection member may include an FPCB 651 or a coaxial cable 661. According to an embodiment, it is illustrated that the electric connection member is divided into two or more members, but the electric connection members may be configured on a single FPCB altogether. According to an embodiment, a drawing-out direction of the electric connection member may face toward the left or right of the communication circuit 630 or a lower end (a lower end of the middle of the second antenna array) of the communication circuit 630. According to an embodiment, the at least one terminal 650, 660 may be arranged on a region of the substrate that is spaced apart from the beam pattern direction by the antenna array 621, 622 among regions of the substrate 610. According to an embodiment, the at least one terminal 650, 660 may be arranged on a region of the substrate 610 that is spaced apart from the beam pattern direction (for example, a radiation direction) (the direction of ①) of the first antenna array 621, and the beam pattern direction (for example, a radiation direction) (the direction of ⑤) of the second antenna array 622. According to an embodiment, the at least one terminal 650, 660 may be arranged on any one of the other sides 612, 613, 614 than the first side 611 on which the first antenna array 621 is arranged, spaced apart from the first antenna array 621 by a specified distance.

Figure 7A:
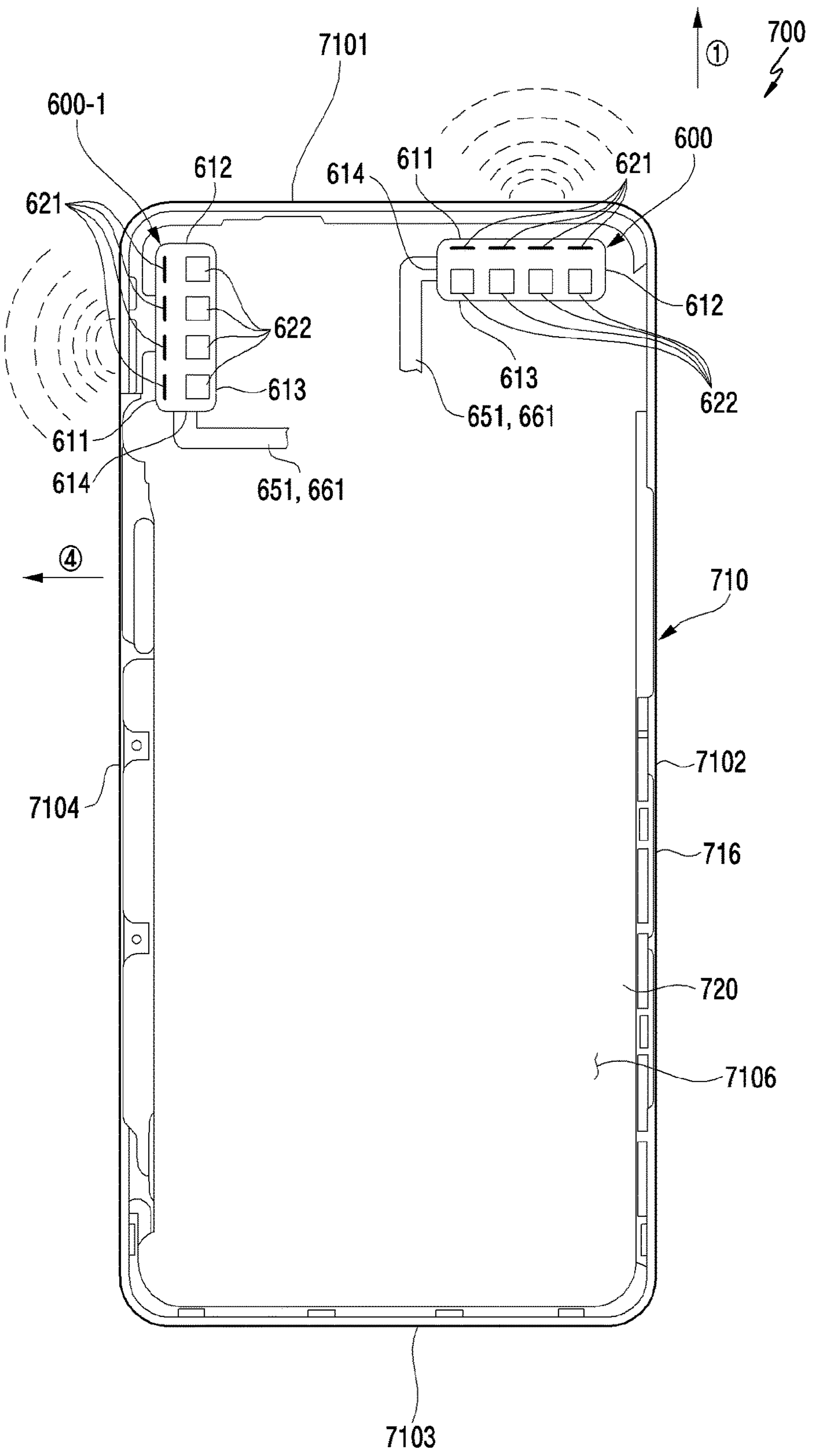
FIGS. 7A and 7B are views illustrating an arrangement of a communication device according to various embodiments of the present disclosure.
Figure 7B:
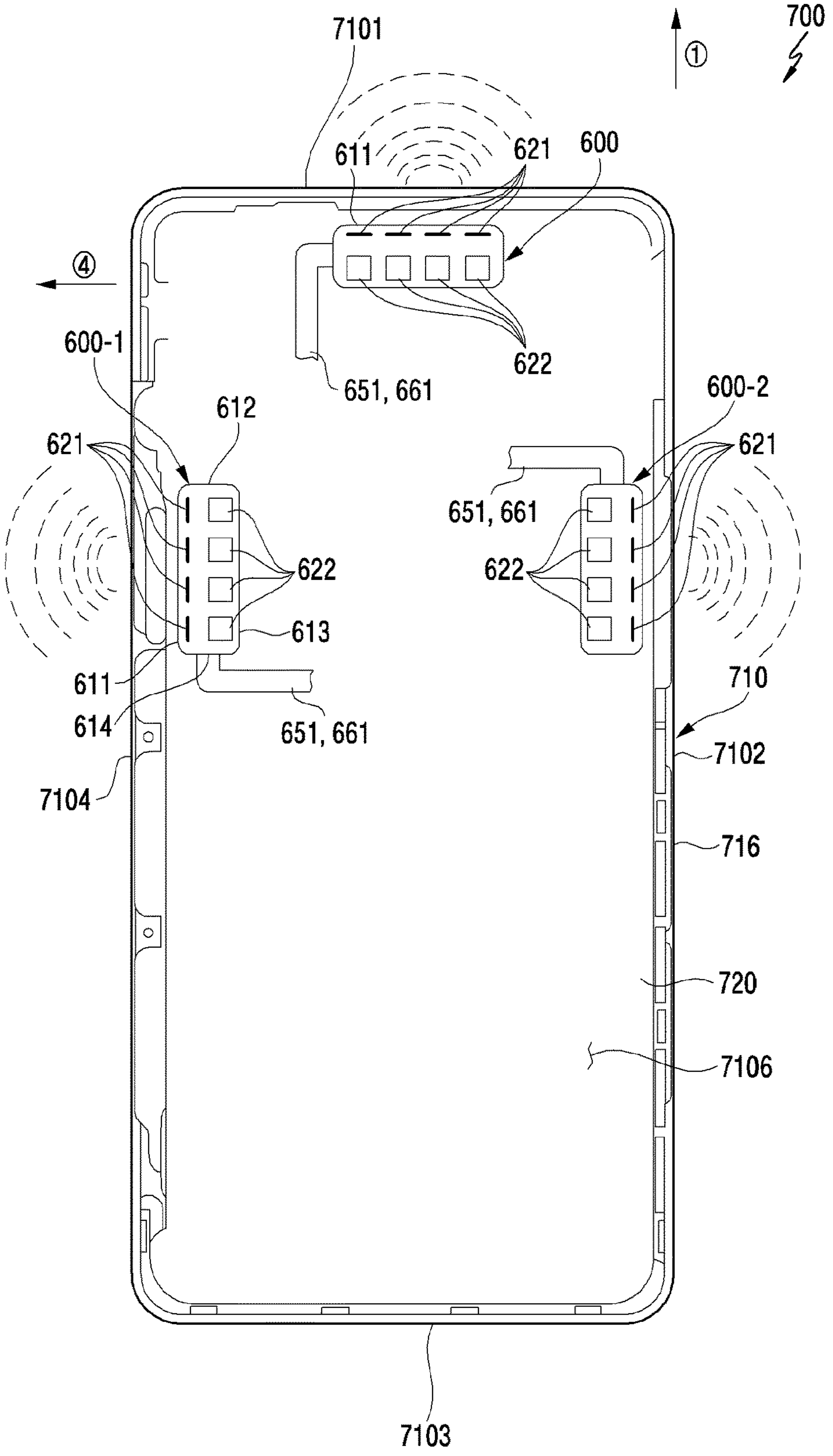

FIGS. 7A and 7B are views illustrating an arrangement of a communication device according to various embodiments of the present disclosure. FIGS. 7A and 7B are views illustrating a configuration in which the communication circuit of FIG. 6 is arranged in an electronic device.

According to an embodiment, the electronic device 700 of FIGS. 7A and 7B may be similar to the electronic device 200 of FIG. 2A at least in part, or may include other embodiments of the electronic device. In explaining the drawings, a configuration in which the communication device is electrically connected with a PCB arranged in the electronic device is similar to the above-described configuration, and thus a detailed description thereof is omitted, and an arrangement structure of the communication device will be mainly described.

Referring to FIG. 7A, the electronic device 700 may include a housing 710. According to an embodiment, the housing 710 may include a side surface member 716. According to an embodiment, at least one portion of the side surface member 716 may be formed by a conductive member, and is implemented as a unit conductive portion by a nonconductive portion, thereby operating as an antenna radiator.

According to various embodiments, the housing 710 may have a first portion 7101 having a first length, a second portion 7102 extending perpendicular to the first portion 7101 and having a second length, a third portion 7103 extending from the second portion 7102 in parallel with the first portion 7101 to have the first length, and a fourth portion 7104 extending from the third portion 7103 in parallel with the second portion 7102 to have the second length.

According to various embodiments, at least one communication device 600, 600-1 may be arranged in an inner space 7106 of the electronic device 700. According to an embodiment, the at least one communication device 600, 600-1 may be arranged in at least one corner of the electronic device 700 having a substantially rectangular shape.

According to various embodiments, a first side 611 of the first communication device 600 may be arranged adjacent to the first portion 7101 of the housing 710, and a second side 612 of the first communication device 600 may be arranged adjacent to the second portion 7102 of the housing 710. In this case, a power terminal (for example, the power terminal 650 of FIG. 6B) and an RF terminal (for example, the RF terminal 660 of FIG. 6B) may be drawn out from a fourth side 614 toward the center of the electronic device 700. In another example, the power terminal and the RF terminal may be drawn out from a third side 613 toward the center of the electronic device. According to an embodiment, a first side 611 of the second communication device 600-1 may be arranged adjacent to the fourth portion 7104 of the housing 710, and a second side 612 of the second communication device 600-1 may be arranged adjacent to the first portion 7101 of the housing 710.

According to various embodiments, the first communication device 600 may form a beam pattern facing toward the first portion 7101 (for example, toward the direction of ①) of the housing 710 by a first antenna array 621, and may form a beam pattern facing toward a rear surface plate (for example, in the direction of −Z of FIG. 2A) of the electronic device by a second antenna array 622. According to an embodiment, the second communication device 600-1 may form a beam pattern facing toward the fourth portion 7104 (for example, toward the direction of ④) of the housing 710 by a first antenna array 621, and may form a beam pattern facing toward the rear surface plate (for example, in the direction of −Z of FIG. 2A) of the electronic device by a second antenna array 622.

Referring to FIG. 7B, at least one communication device 600, 600-1, 600-2 may be arranged on a certain region of each edge of the electronic device 700. According to an embodiment, a first side 611 of the first communication device 600 may be arranged adjacent to and in parallel with the first portion 7101 on a substantially center of the first portion 7101 of the housing 710. According to an embodiment, a first side 611 of the second communication device 600-1 may be arranged adjacent to and in parallel with the fourth portion 7104 on a certain region of the fourth portion 7104 of the housing 710. According to an embodiment, a first side 611 of the third communication device 600-2 may be arranged adjacent to and in parallel with the second portion 7102 on a certain region of the second portion 7102 of the housing 710.

According to various embodiments, the first communication device 600 may form a beam pattern facing toward the first portion 7101 (for example, toward the direction of ①) of the housing 710 by a first antenna array 621, and may form a beam pattern facing toward the rear surface plate (for example, in the direction of −Z of FIG. 2A) of the electronic device by a second antenna array 622. According to an embodiment, the second communication device 600-1 may form a beam pattern facing toward the fourth portion 7104 (for example, toward the direction of ④) of the housing 710 by a first antenna array 621, and may form a beam pattern facing toward the rear surface plate (for example, in the direction of −Z of FIG. 2A) of the electronic device by a second antenna array 622. According to an embodiment, the third communication device 600-2 may form a beam pattern facing toward the second portion 7102 (for example, toward the direction of ②) of the housing 710 by a first antenna array 621, and may form a beam pattern facing toward the rear surface plate (for example, in the direction of −Z of FIG. 2A) of the electronic device by a second antenna array 622.

According to various embodiments, a region of the housing 710 corresponding to a portion on which the communication device 600, 600-1, 600-2 is mounted may be formed of a material (for example, a dielectric substance) other than a conductive material to prevent degradation of radiation performance of the communication device. However, this should not be considered as limiting. The corresponding region of the housing may be substituted with a hole formed on the housing in the beam forming direction of the communication device, or with a metal-organic framework (for example, a metal grid) through which beams can pass.

Figure 8A:
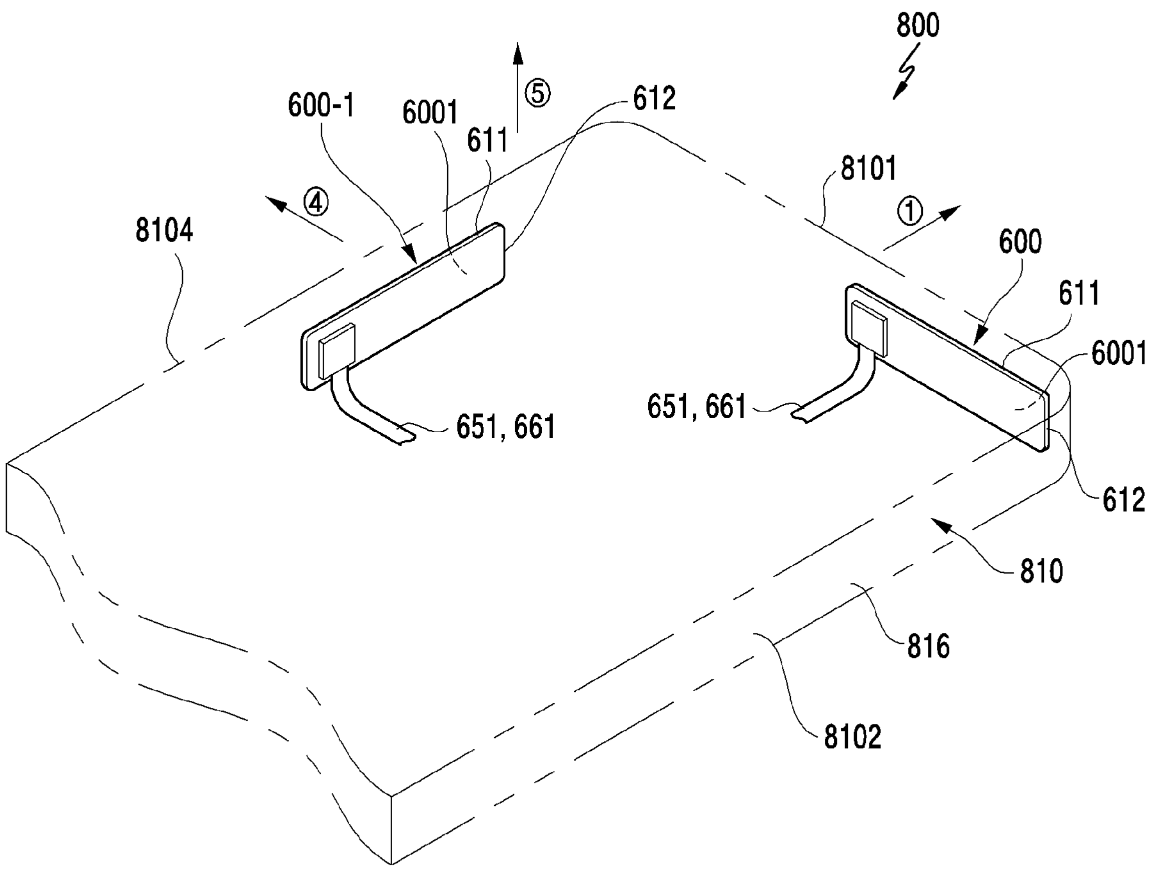
FIGS. 8A-8C are views illustrating an arrangement of a communication device according to various embodiments of the present disclosure.
Figure 8B:
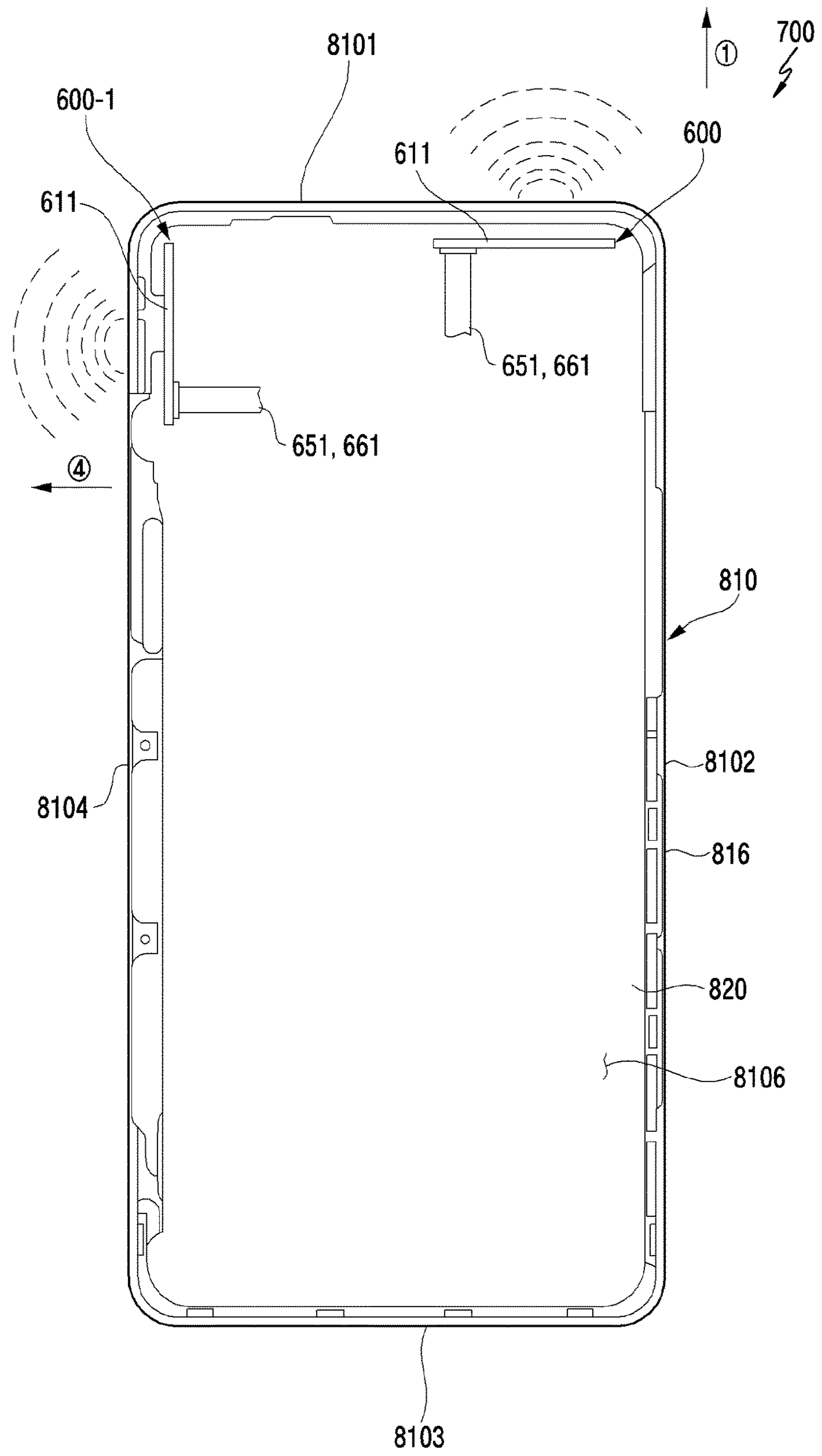
Figure 8C:
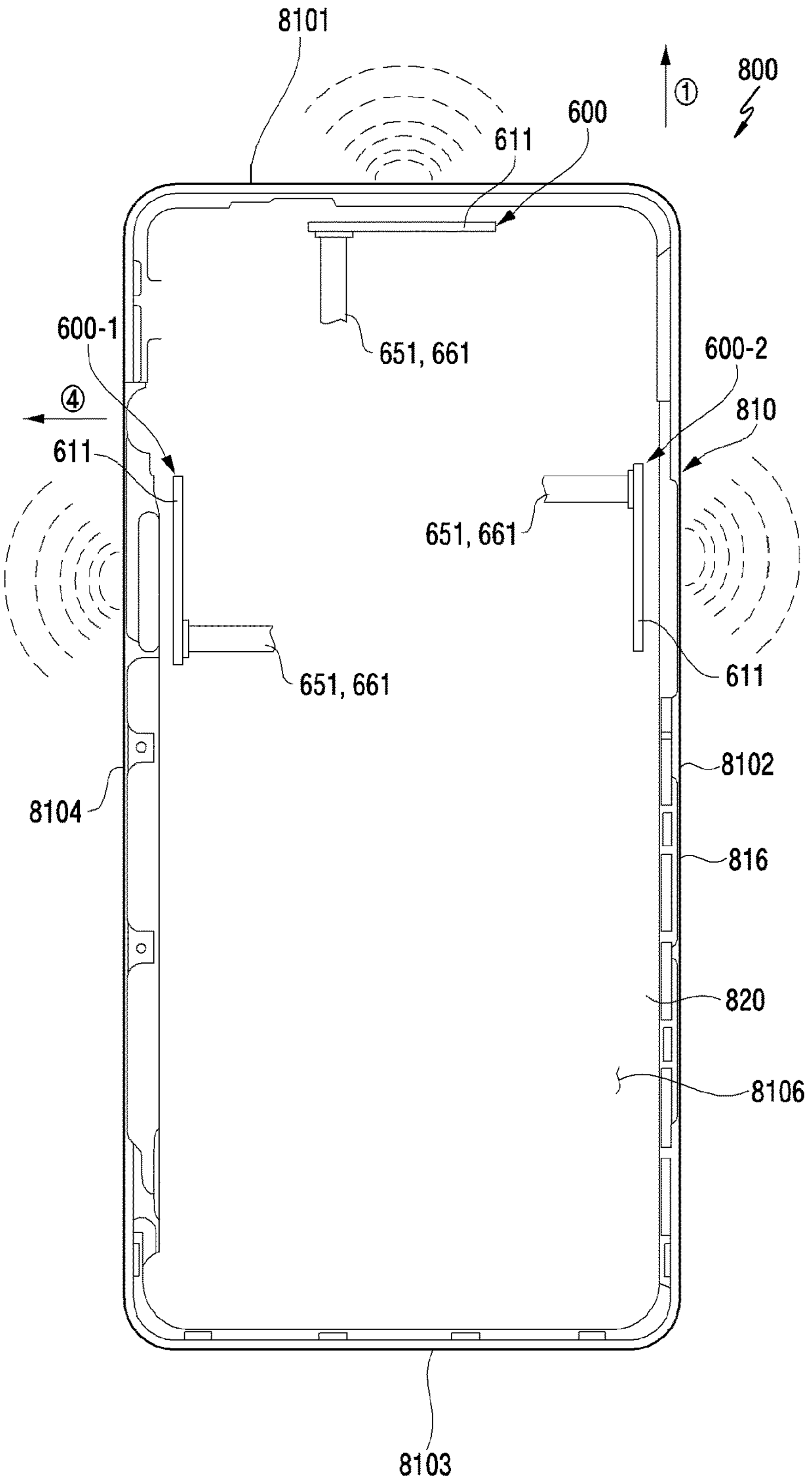

FIGS. 8A, 8B, and 8C are views illustrating an arrangement of a communication device according to various embodiments of the present disclosure.

FIGS. 8A, 8B, and 8C are views illustrating a configuration in which the communication circuit of FIG. 6 is arranged in an electronic device.

The electronic device 800 of FIGS. 8A, 8B, and 8C may be similar to the electronic device 200 of FIG. 2A at least in part, or may include other embodiments of the electronic device. In explaining the drawings, a configuration in which a communication device 600, 600-1 is electrically connected with a PCB arranged in the electronic device 800 is similar to the above-described configuration, and thus a detailed description thereof is omitted, and an arrangement structure of the communication device 600, 600-1 will be mainly described.

Referring to FIGS. 8A and 8B, the electronic device 800 may include a housing 810. According to an embodiment, the housing 810 may include a side surface member 816. According to an embodiment, at least one portion of the side surface member 816 may be formed by a conductive member, and may be implemented as a unit conductive portion by a nonconductive portion, thereby operating as an antenna radiator.

According to various embodiments, the housing 810 may include a first portion 8101 having a first length, a second portion 8102 extending perpendicular to the first portion 8101 and having a second length, a third portion 8103 extending from the second portion 8102 in parallel with the first portion 8101 to have the first length, and a fourth portion 8104 extending from the third portion 8103 in parallel with the second portion 8102 to have the second length.

According to various embodiments, at least one communication device 600, 600-1 may be arranged in an inner space 8106 of the electronic device 800. According to an embodiment, the at least one communication device 600, 600-1 may be arranged adjacent to at least one side of the electronic device 800 having a substantially rectangular shape. According to an embodiment, the at least one communication device 600, 600-1 may be arranged in such a manner that a first surface 6001 faces toward the side surface member 816 of the housing 810.

According to various embodiments, the first communication device 600 may be arranged on a position adjacent to the first portion 8101 among regions where the first portion 8101 and the second portion 8102 of the housing 810 meet in the inner space 8106 of the electronic device 800 to have the first surface 6001 face toward the first portion 8101. According to an embodiment, the second communication device 600-1 may be arranged on a position adjacent to the fourth portion 8104 among regions where the first portion 8101 and the fourth portion 8104 of the housing 810 meet to have a first surface 6001 face toward the fourth portion 8104.

According to various embodiments, the first communication device 600 may form a beam pattern facing toward the rear surface plate of the electronic device (for example, in the direction of −Z of FIG. 2A) (for example, the direction of ⑤) by a first antenna array 621, and may form a beam pattern facing toward the first portion 8101 of the housing 810 (for example, toward the direction of ①) by a second antenna array 622. According to an embodiment, the second communication device 600-1 may form a beam pattern facing toward the rear surface plate of the electronic device (for example, in the direction of −Z of FIG. 2A) (for example, the direction of ⑤) by a first antenna array 621, and may form a beam facing toward the fourth portion 8104 of the housing 810 (for example, toward the direction of ④) by a second antenna array 622.

Referring to FIG. 8C, at least one communication device 600, 600-1, 600-2 may be arranged on a certain region of an edge of the electronic device 800. According to an embodiment, the first communication device 600 may be arranged to have the first surface 6001 face the first portion 8101 on a substantially center of the first portion 8101 of the housing 810. According to an embodiment, the second communication device 600-1 may be arranged to have the first surface 6001 be adjacent to and in parallel with the fourth portion 8104 on a certain region of the fourth portion 8104 of the housing 810. According to an embodiment, the third communication device 600-2 may be arranged to have the first surface 6001 be adjacent to and in parallel with the second portion 8102 on a certain region of the second portion 8102 of the housing 810.

According to various embodiments, the first communication device 600 may form a beam pattern facing toward the rear surface plate of the electronic device (for example, in the direction of −Z of FIG. 2A) (for example, the direction of ⑤) by a first antenna array 621, and may form a beam pattern facing toward the first portion 8101 of the housing 810 (for example, toward the direction of ①) by a second antenna array 622. According to an embodiment, the second communication device 600-1 may form a beam pattern facing toward the rear surface plate of the electronic device (for example, in the direction of −Z of FIG. 2A) (for example, the direction of ⑤ of FIG. 8A) by a first antenna array 621, and may form a beam pattern facing toward the fourth portion 8104 of the housing 810 (for example, toward the direction of ④) by a second antenna array 622. According to an embodiment, the third communication device 600-2 may form a beam pattern facing toward the rear surface plate of the electronic device (for example, in the direction of −Z of FIG. 2A) (for example, the direction of ⑤ of FIG. 8A) by a first antenna array 621, and may form a beam pattern facing toward the second portion 8102 of the housing 810 (for example, toward the direction of ②) by a second antenna array 622.

According to various embodiments, although not shown, the communication device 600 illustrated in FIGS. 6A and 6B may be arranged in at least one portion of each corner or each edge of the electronic device having the substantially rectangular shape, or may be arranged in a corner or on an edge in combination.

According to various embodiments, a region of the housing 810 corresponding to a portion on which the communication device 600, 600-1, 600-2 is mounted may be formed of a material (for example, a dielectric substance) other than a conductive material to prevent degradation of radiation performance of the communication device. However, this should not be considered as limiting. The corresponding region of the housing may be substituted with a hole formed on the housing in the beam forming direction of the communication device, or with a metal-organic framework (for example, a metal grid) through which beams can pass.

Figure 9:
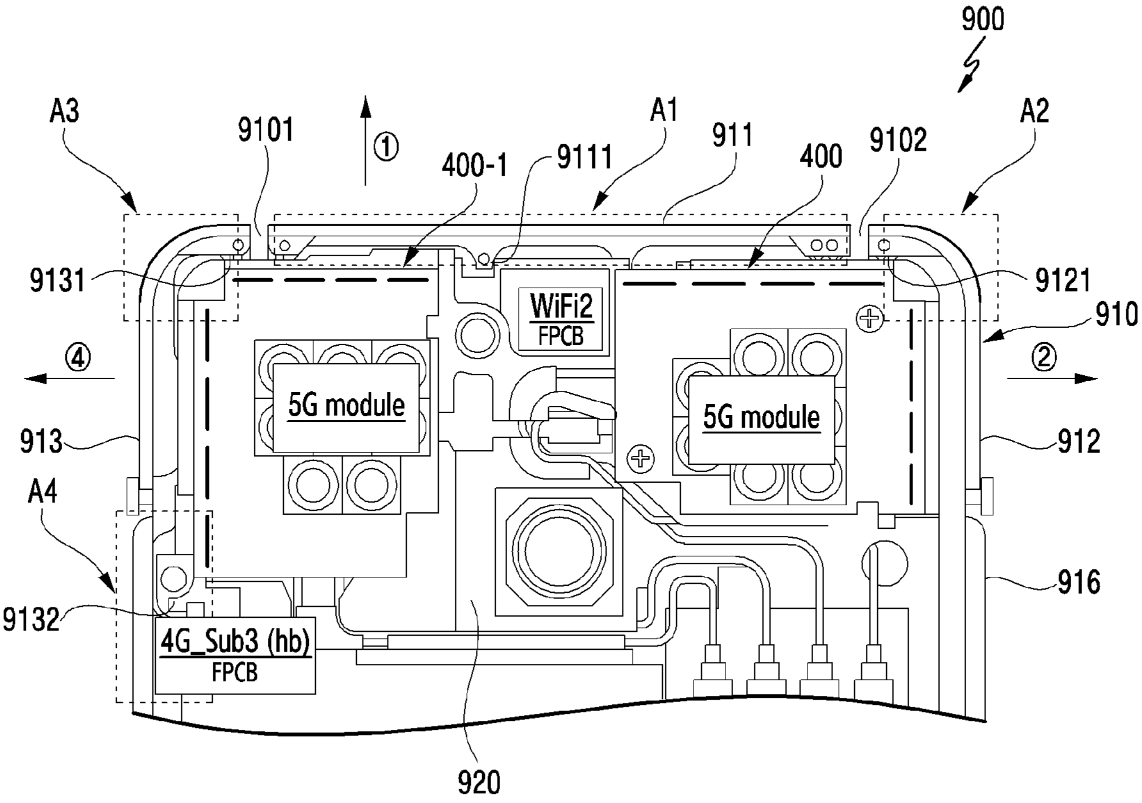
FIG. 9 is a view illustrating an arrangement structure of communication devices of an electronic device according to various embodiments of the present disclosure.

FIG. 9 is a view illustrating an arrangement structure of communication devices of an electronic device according to various embodiments of the present disclosure.

According to an embodiment, the electronic device 900 of FIG. 9 may be similar to the electronic device 101 of FIG. 1, the electronic device 200 of FIG. 2A, the electronic device 300 of FIG. 3, the electronic device 500 of FIG. 5, the electronic device 700 of FIGS. 7A and 7B, or the electronic device 800 of FIGS. 8A, 8B, and 8C at least in part, or may include other embodiments of the electronic device.

Referring to FIG. 9, the electronic device 900 may include a housing 910. According to an embodiment, the housing 910 may be formed of a conductive member and/or a nonconductive member. According to an embodiment, the housing 910 may include a first conductive portion 911 having a first length, a second conductive portion 912 extending perpendicular to the first conductive portion 911 and having a second length, and a third conductive portion 913 extending perpendicular to the first conductive portion 911 and in parallel with the second conductive portion 912. Although not shown, the housing 910 may include a fourth conductive portion (for example, the third portion 5103 of FIG. 5) extending from an end of the second conductive portion 912 to the third conductive portion 913 and arranged in parallel with the first conductive portion 911. According to an embodiment, a side surface member 916 may include unit conductive portions 911, 912, 913 which are electrically isolated from one another by a pair of nonconductive portions 9101, 9102 spaced apart from each other by a predetermined distance on the first conductive portion 911.

According to various embodiments, at least one portion of the first conductive portion 911 may be electrically connected with a communication circuit (for example, the communication circuit 390 of FIG. 3) mounted on a PCB (for example, the PCB 350 of FIG. 3) of the electronic device 900 at a first point 9111, thereby operating as a first antenna A1. According to an embodiment, at least one portion of the second conductive portion 912 may be electrically connected with the communication circuit mounted on the PCB of the electronic device at a second point 9121, thereby operating as a second antenna A2. At least one portion of the third conductive portion 913 may be electrically connected with the communication circuit mounted on the PCB of the electronic device at a third point 9131 and a fourth point 9132, thereby operating as a third antenna A3 and a fourth antenna A4. According to an embodiment, each point may be physically connected to the PCB by using a C-clip, a conductive contact, or the like, or may be electrically connected to the PCB by an electric connection member such as an FPCB. According to an embodiment, the first antenna A1 may contribute as a multi-band antenna operating in a low band and a mid band. According to an embodiment, the second antenna A2 may contribute as a short-range wireless communication antenna operating in a WiFi band and a BT band. According to an embodiment, the third antenna A3 may contribute as an antenna operating in a high band, a mid band, and as a GPS. According to an embodiment, the fourth antenna A4 may contribute as an antenna operating in a high band.

According to various embodiments, the electronic device 900 may include a first communication device 400 arranged in a corner between the first conductive portion 911 and the second conductive portion 912, or a second communication device 400-1 arranged in a corner between the first conductive portion 911 and the third conductive portion 913. According to an embodiment, the first communication device 400 or the second communication device 400-1 may be the same or similar module, and may perform wireless communication in a band ranging from around 20 GHz to 100 GHz. However, this should not be considered as limiting, and the first communication device 400 and the second communication device 400-1 may be substituted with the communication device 600 of FIG. 6A. According to an embodiment, the first communication device 400 may form a beam pattern toward the first conductive portion (the direction of ①) and the second conductive portion (the direction of ②) as shown in FIG. 9. The second communication device 400-1 may form a beam pattern toward the first conductive portion (the direction of ①) and the third conductive portion (the direction of ④).

Figure 11A:
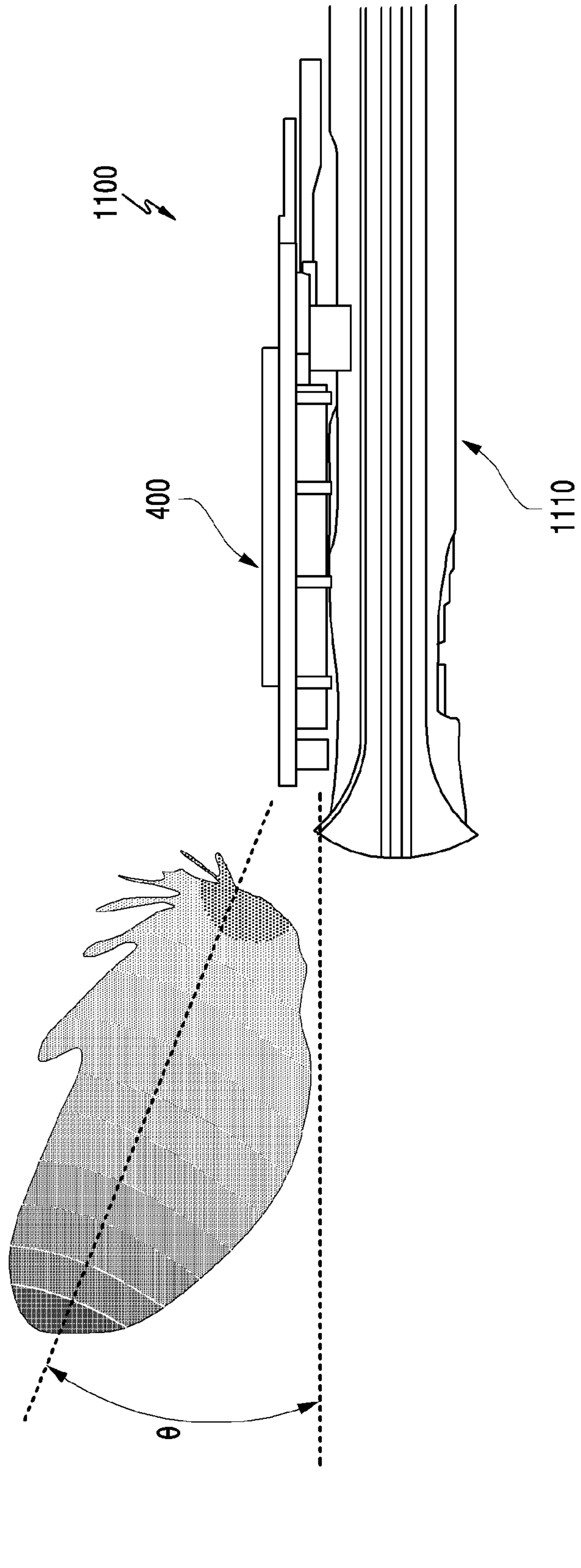
FIG. 11A is a view illustrating an arrangement relationship between an existing housing and a communication device, and a beam pattern direction of the communication device.

According to various embodiments, at least part of the first conductive portion 911, the second conductive portion 912, and the third conductive portion 913 of the housing 910 arranged adjacent to the first and second communication devices 400, 400-1 may influence the beam patterns of the first and second communication devices 400, 400-1. For example, as shown in FIG. 11A, the beam pattern of the communication device 400 may be tilted in an unintended direction (for example, tilted by θ) by a corresponding region (for example, the first conductive portion) of the housing 1110 overlapping the beam pattern direction of the communication device 400 arranged in the electronic device, and tilting of the beam pattern may induce degradation of radiation efficiency of the communication device 400. According to an embodiment, the region overlapping the beam pattern direction of the communication device 400 may be formed to be void of a conductive portion.

Figure 10A:
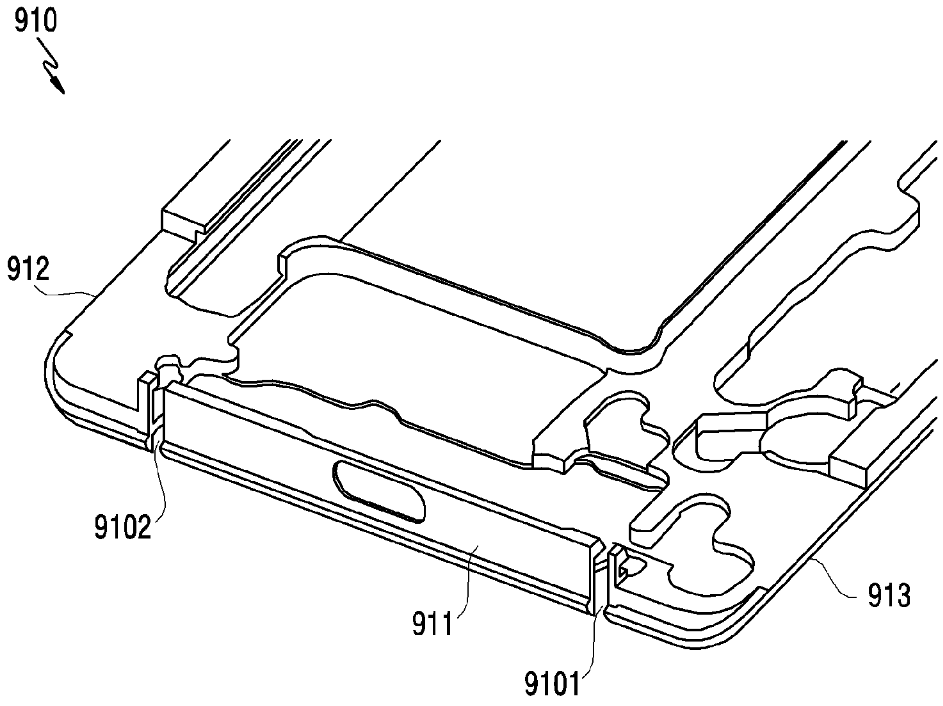
FIGS. 10A-10C are views illustrating a configuration of a housing of an electronic device according to various embodiments of the present disclosure.
Figure 10B:
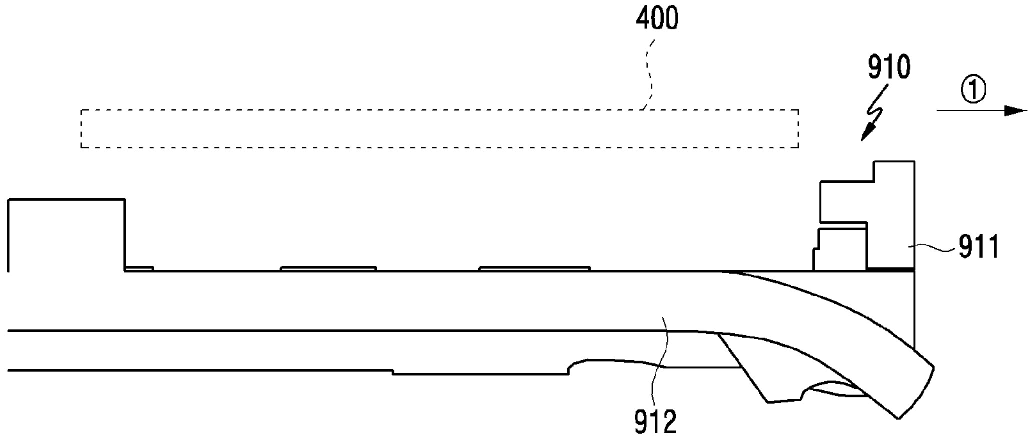
Figure 10C:
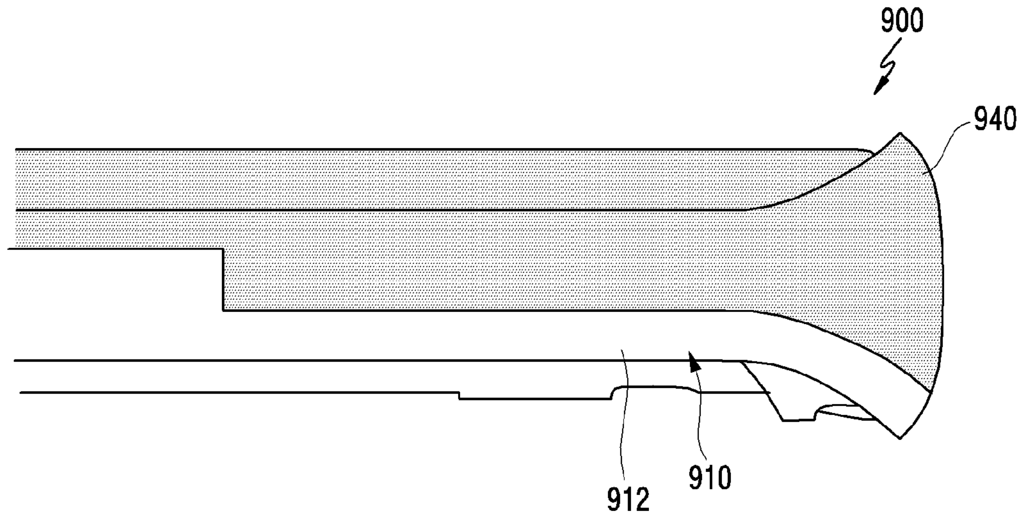

FIGS. 10A, 10B, and 10C are views illustrating a configuration of a housing of an electronic device according to various embodiments of the present disclosure.

Figure 11B:
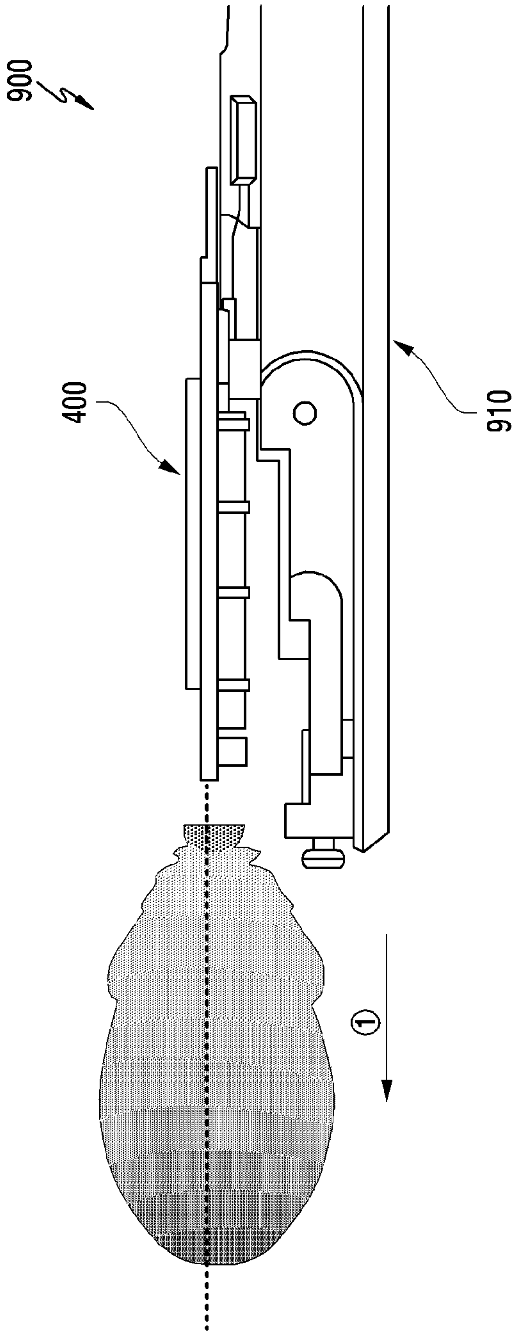
FIG. 11B is a view illustrating an arrangement relationship between an existing housing and a communication device according to various embodiments of the present disclosure, and a beam pattern direction of the communication device.

Referring to FIGS. 10A, 10B, and 10C, at least part of the housing 910 may be formed of a conductive member. According to an embodiment, the communication device 400 may be arranged on at least one portion of the housing 910, and at least part of the conductive member of the first conductive portion 911 that overlaps the beam pattern direction (the direction of ①) of the communication device 400 may be excluded. According to an embodiment, at least part of the conductive members of the second conductive portion 912 and the third conductive portion 913 may be formed to exclude a region overlapping the beam pattern direction of the communication device 400 and/or 400-1. According to an embodiment, the excluded region of the housing 910 described above may be formed on the housing by using a nonconductive member 940 through double injection molding when necessary. For example, when the corresponding region of the first conductive portion 911 overlapping the beam pattern direction of the communication device 400 is excluded as shown in FIG. 11B, directivity of the beam pattern is constantly maintained in a specified direction, and this can be interpreted as indicating that radiation performance of the communication device 400 and/or 400-1 is constantly maintained.

Although not shown, in addition to the conductive portions of the housing arranged in the proximity of the communication device, conductive electronic components (for example, a speaker module, a microphone module, an interface connector port, an ear jack assembly, a sensor module, or various kinds of switches) arranged in the electronic device may be arranged to avoid overlapping the beam pattern direction of the communication device, or at least one portion thereof may be substituted with a nonconductive member, such that degradation of radiation performance of the communication device can be prevented.

According to various embodiments, an electronic device (for example, the electronic device 200) may include: a housing (for example, the housing 210 of FIG. 2A) including: a front surface plate (the front surface plate 2011 of FIG. 2A); a rear surface plate (the rear surface plate 211 of FIG. 2A) facing toward the opposite direction of the front surface plate; and a side surface member (for example, the side surface member 216 of FIG. 2A) surrounding a space between the front surface plate and the rear surface plate, the side surface member having a substantially rectangular shape when viewed above the front surface plate, the side surface member including: a first portion (for example, the first portion 2101 of FIG. 2A) having a first length and extending in a first direction; a second portion (for example, the second portion 2102 of FIG. 2A) having a second length longer than the first length, and extending in a second direction perpendicular to the first direction; a third portion (for example, the third portion 2103 of FIG. 2A) having the first length and extending in the first direction in parallel with the first portion; and a fourth portion (for example, the fourth portion 2104 of FIG. 2A) having the second length and extending in the second direction in parallel with the second portion; a first PCB (for example, the PCB 520 of FIG. 5) arranged in the space; a first wireless communication circuit (for example, the communication circuit 390 of FIG. 3) which is mounted on the first PCB and is electrically connected with a first point (for example, the first point 5105 of FIG. 5) of the first portion of the side surface member, and provides wireless communication ranging from around 500 MHz to 6000 MHz; a substrate (for example, the substrate 410 of FIG. 5) arranged close to a corner in the space in parallel with the rear surface plate, the substrate including: a first side (for example, the first side 411 of FIG. 5) extending along a part of the first portion, a second side (for example, the second side 412 of FIG. 5) extending along the second portion; a third side (for example, the third side 413 of FIG. 5) extending in parallel with the first side; and a fourth side (for example, the fourth side 414 of FIG. 5) extending in parallel with the second side; a first antenna array (for example, the first antenna array 421 of FIG. 5) protruding from the first side of the substrate toward the first portion; a second antenna array (for example, the second antenna array 422 of FIG. 5) protruding from the second side of the substrate toward the second portion; and a second wireless communication circuit (for example, the RFIC 311, 321, 331, 341 of FIG. 3) attached to a first part (for example, the first part P1 of FIG. 4A and FIG. 4B) on the third side closer to the fourth side than the second portion, or attached to a second part (for example, the second part P2 of FIG. 4A and FIG. 4B) on the fourth side closer to the third side than the first portion, and the second wireless communication circuit may be electrically connected to the first antenna array and the second antenna array, and provides wireless communication ranging from around 20 GHz to 100 GHz.

According to various embodiments, the electronic device may further include an FPCB attached to the first part or the second part, and the second wireless communication circuit may be mounted on the FPCB.

According to various embodiments, the electronic device may further include a third antenna array arranged on the substrate and facing toward the rear surface plate.

According to various embodiments, the second wireless communication circuit may include an RF circuit and a power connector.

According to various embodiments, the first portion may be divided into unit conductive portions by a pair of non-conductive portions having the first point therebetween.

According to various embodiments, the substrate may further include: a first surface including the first antenna array and the second antenna array; and a second surface opposite the first surface and having the second wireless communication circuit mounted thereon.

According to various embodiments, the substrate may be arranged in the space to have the first surface face toward the rear surface plate.

According to various embodiments, the substrate may be arranged adjacent to a corner at which the first portion and the second portion meet.

According to various embodiments, the electronic device may further include at least one conductive member arranged in a direction in which the first antenna array protrudes toward the first portion, and/or a direction in which the second antenna array protrudes toward the second portion, and a region of the conductive member that overlaps a portion protruding toward the first portion, and/or a region of the conductive member that overlaps a portion protruding toward the second portion may exclude a conductive portion.

According to various embodiments, the excluded region may be substituted with a nonconductive member.

According to various embodiments, the conductive member may include at least one portion of the first portion and/or the second portion.

According to various embodiments, the conductive member may include at least one of a speaker module, a microphone module, an interface connector port, an ear jack assembly, a sensor module, or various kinds of switches arranged in the electronic device.

According to various embodiments, an electronic device may include: a housing including: a front surface plate; a rear surface plate facing toward the opposite direction of the front surface plate; and a side surface member surrounding a space between the front surface plate and the rear surface plate, the side surface member having a substantially rectangular shape when viewed above the front surface plate, the side surface member including: a first portion having a first length and extending in a first direction; a second portion having a second length longer than the first length and extending in a second direction perpendicular to the first direction; a third portion having the first length and extending in the first direction in parallel with the first portion; and a fourth portion having the second length and extending in the second direction in parallel with the second portion; a first substrate arranged in the space; a first wireless communication circuit which is mounted on the first substrate and is electrically connected with a first point of the first portion of the side surface member, and provides wireless communication of a first frequency band; a second substrate arranged in the proximity of a corner between the first portion and the second portion in the space in parallel with the rear surface plate, the second substrate including: a first side extending along a part of the first portion, a second side extending along the second portion; a third side extending in parallel with the first side; and a fourth side extending in parallel with the second side; a first antenna array arranged to form a beam pattern in a direction from the first side of the second substrate toward the first portion; a second antenna array arranged to form a beam pattern in a direction from the second side of the second substrate toward the second portion; a third substrate having a same configuration as that of the second substrate, and arranged in the proximity of a corner between the second portion and the third portion in the space in parallel with the rear surface plate, after being rotated by 90 degrees in the clockwise direction with reference to the arrangement state of the second substrate; a fourth substrate having a same configuration as that of the second substrate, and arranged in the proximity of a corner between the third portion and the fourth portion in the space in parallel with the rear surface plate, after being rotated by 90 degrees in the clockwise direction with reference to the arrangement state of the third substrate; a fifth substrate having a same configuration as that of the second substrate, and arranged in the proximity of a corner between the fourth portion and the first portion in the space in parallel with the rear surface plate, after being rotated by 90 degrees in the clockwise direction with reference to the arrangement state of the fourth substrate; and a second wireless communication circuit attached to a first part on the third side closer to the fourth side than the second portion, or attached to a second part on the fourth side closer to the third side than the first portion, and the second wireless communication circuit may be electrically connected to the first antenna array and the second antenna array and provides wireless communication in a second frequency band.

According to various embodiments, the first frequency band may include a frequency band ranging from around 500 MHz to 6000 MHz.

According to various embodiments, the second frequency band may include a frequency band ranging from around 20 GHz to 100 GHz.

According to various embodiments, the electronic device may further include at least one conductive member arranged in a beam pattern direction of the first antenna array and/or in a beam pattern direction of the second antenna array, and a region of the conductive member that overlaps the beam pattern direction of the first antenna array and/or the second antenna array may exclude a conductive portion.

According to various embodiments, the excluded region may be substituted with a nonconductive member.

According to various embodiments, the conductive member may include at least one portion of at least one of the first portion, the second portion, the third portion, and/or the fourth portion.

According to various embodiments, the conductive member may include at least one of a speaker module, a microphone module, an interface connector port, an ear jack assembly, a sensor module, or various kinds of switches arranged in the electronic device.

According to various embodiments, the second wireless communication circuit may include an RF circuit and a power connector.

The present disclosure has been described with reference to various example embodiments thereof. It will be understood by a person skilled in the art that the present disclosure can be implemented in modified forms without departing from the essential characteristics of the present disclosure. Therefore, disclosed embodiments should be considered from a descriptive perspective, not from a limited perspective. The scope of the present disclosure is defined not by the detailed description but by the appended claims, and all differences within the scope should be understood as being included in the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A portable communication device comprising:
- a housing comprising:
  - a front face plate,
  - a rear face plate, and
  - a conductive side face member substantially surrounding a space between the front face plate and the rear face plate, the conductive side face member including a hole portion substantially filled with a non-conductive material;
- a first substrate disposed in the housing;
- a communication processor disposed on the first substrate; and
- a first communication device comprising:
  - a second substrate including a dielectric, wherein a first face of the second substrate faces the hole portion included in the conductive side face member;
  - a first antenna array disposed on the dielectric of the second substrate to face the hole portion; and
  - a radio frequency integrated circuit (RFIC) disposed on a second face of the second substrate opposite to the first face,
- wherein the first antenna array is configured to radiate at least part of a beam of radio frequency (RF) signals from the RFIC in a direction toward the hole portion based on a control by the communication processor.

2. The portable communication device of claim 1, wherein the first antenna array comprises a plurality of patch antennas.

3. The portable communication device of claim 1, wherein the RFIC is configured to control the first antenna array such that a frequency band of the RF signals is within a range from 20 GHz to 100 GHz.

4. The portable communication device of claim 1, further comprising:
- a metal grid disposed within the hole portion.

5. The portable communication device of claim 1, further comprising:
- an intermediate frequency integrated circuit (IFIC) disposed on the first substrate,
- wherein the IFIC is electrically connected to the RFIC disposed on the second substrate, and
- wherein the IFIC is electrically connected to the communication processor disposed on the first substrate.

6. The portable communication device of claim 5, wherein the RFIC disposed on the second substrate is configured to convert first RF signals from the first antenna array into first intermediate frequency (IF) signals, and
- wherein the IFIC disposed on the first substrate is configured to convert the first IF signals from the RFIC into first baseband signals, and transmit the first baseband signals to the communication processor.

7. The portable communication device of claim 5, wherein the IFIC disposed on the first substrate is configured to convert baseband signals from the communication processor into intermediate frequency (IF) signals, and
- wherein the RFIC disposed on the second substrate is configured to convert the IF signals from the IFIC into the RF signals, and transmit the RF signals to the first antenna array.

8. The portable communication device of claim 1, further comprising:
- a second communication device comprising a third substrate and a second antenna array disposed on a dielectric of the third substrate to face the rear face plate,
- wherein the second antenna array is configured to form a beam of RF signals in a direction toward the rear face plate.

9. The portable communication device of claim 8, wherein the second communication device is configured to provide a wireless communication ranging from 20 GHz to 100 GHz.

10. The portable communication device of claim 8, further comprising:
- a third communication device comprising a fourth substrate and a third antenna array disposed on a dielectric of the fourth substrate,
- wherein the third communication device is configured to provide a wireless communication ranging from 20 GHz to 100 GHz.

11. The portable communication device of claim 1, further comprising:
- the RFIC disposed on the first substrate,
- wherein the RFIC disposed on the first substrate is electrically connected to a conductive member of the conductive side face member, and
- wherein the RFIC is configured to provide a communication ranging 500 MHz to 100 GHz.

12. The portable communication device of claim 11, wherein the communication processor and the RFIC disposed on the first substrate are electrically connected.

13. The portable communication device of claim 1, wherein the first face is adjacent to the hole portion formed in the conductive side face member.

14. The portable communication device of claim 1, wherein the first communication device further comprises an RF terminal and a power terminal which are disposed on the second face of the second substrate.

15. The portable communication device of claim 1, further comprising:
- a terminal disposed on the second face of the second substrate; and
- a flexible printed circuit board (FPCB) connected to the terminal to electrically connect the first substrate and the second substrate.

* * * * *